(12) United States Patent
Belzons et al.

(10) Patent No.: US 10,131,210 B2
(45) Date of Patent: Nov. 20, 2018

(54) AIR NOZZLE DEVICE FOR A VEHICLE

(71) Applicant: Ningbo Geely Automobile Research & Development Co., Ltd

(72) Inventors: Lionel Belzons, Nödinge (SE); Richard Stark, Göteborg (SE); Christian Cyrulewski, Vargön (SE)

(73) Assignee: Ningbo Geely Automobile Research & Development Co., Ltd., Ningbo (CN)

( * ) Notice: Subject to any disclaimer, the term of this patent is extended or adjusted under 35 U.S.C. 154(b) by 0 days.

(21) Appl. No.: 15/285,429

(22) Filed: Oct. 4, 2016

(65) Prior Publication Data
US 2017/0100988 A1 Apr. 13, 2017
Related U.S. Application Data

(63) Continuation of application No. PCT/EP2015/076157, filed on Nov. 10, 2015.

(30) Foreign Application Priority Data

Nov. 10, 2014 (SE) ...................................... 1451348

(51) Int. Cl.
*B60H 1/34* (2006.01)
(52) U.S. Cl.
CPC ... *B60H 1/3421* (2013.01); *B60H 2001/3478* (2013.01)
(58) Field of Classification Search
CPC .......... B60H 2001/3478; B60H 1/3421; F23D 2201/20
See application file for complete search history.

(56) References Cited

U.S. PATENT DOCUMENTS 511,296 A * 12/1893 Ewald ................. F24F 13/1426
454/322

1,527,214 A * 2/1925 Peabody ................. F23C 7/006
126/200

(Continued)

FOREIGN PATENT DOCUMENTS

DE 102007019602 B3 3/2008
DE 202010000445 U1 7/2010
(Continued)

OTHER PUBLICATIONS

Machine translation of DE202013100257 (DE202013100257 wipo translate.pdf).*

(Continued)

*Primary Examiner* — Avinash Savani
*Assistant Examiner* — Martha Becton
(74) *Attorney, Agent, or Firm* — Lee & Hayes, PLLC

(57) ABSTRACT

The present invention relates to an air nozzle device (10) for a vehicle (1) comprising a housing (11) defining an interior volume and having an air inlet (12) at one side, an air discharge opening (14) at a second side and an air flow channel (18) through the housing (11) for transporting a flow of air between the air inlet and the air discharge opening, the device (10) further comprising a user-actuated manual mechanism (32), a moveable first linkage assembly (34), a moveable second linkage assembly (36), a shutoff mechanism (40) configured to regulate the air flow, a first air flow adjustment arrangement (22) and a second air flow adjustment arrangement (24), each being pivotably connected to said housing and configured to adjust the direction of the air flow, wherein said user-actuated manual mechanism (32) is configured to permit manual operation of the first air flow adjustment arrangement (22), the second air flow adjustment (24) and the shutoff mechanism (40) from the outside of the device. The present invention also relates to a vehicle compartment comprising an air nozzle device.

17 Claims, 18 Drawing Sheets

(56) References Cited

U.S. PATENT DOCUMENTS

| | | | | |
|---|---|---|---|---|
| 2,320,576 A * | 6/1943 | Dunn | F23C 7/006 | 110/261 |
| 2,895,435 A * | 7/1959 | Bogot | F23D 1/00 | 239/424 |
| 2,964,966 A * | 12/1960 | Miller | F24F 11/89 | 74/483 R |
| 3,034,531 A * | 5/1962 | Kennedy | F24F 13/10 | 137/601.04 |
| 3,552,295 A * | 1/1971 | Armstrong | B60H 1/3421 | 454/315 |
| 3,802,328 A * | 4/1974 | Kakizaki | B60H 1/3442 | 137/601.05 |
| 3,823,875 A * | 7/1974 | Bauer | F23D 1/00 | 239/419.5 |
| 4,356,975 A * | 11/1982 | Chadshay | F23D 1/00 | 239/419.5 |
| 4,413,551 A * | 11/1983 | Jackson | B60H 1/3414 | 239/553 |
| 4,520,739 A * | 6/1985 | McCartney | F23D 1/00 | 110/263 |
| 4,796,518 A * | 1/1989 | Murray | B60H 1/3421 | 454/155 |
| 5,215,259 A * | 6/1993 | Wark | F23D 1/00 | 110/263 |
| 5,338,252 A * | 8/1994 | Bowler | B60H 1/3421 | 454/155 |
| 5,482,506 A * | 1/1996 | Tsuda | B29C 45/0017 | 454/155 |
| 5,483,906 A * | 1/1996 | Hufton | F23D 1/00 | 110/260 |
| 5,535,686 A * | 7/1996 | Chung | F23D 1/02 | 110/264 |
| 5,788,220 A * | 8/1998 | Meziere, Sr. | B60H 1/3435 | 251/305 |
| 6,652,371 B2 * | 11/2003 | Kamio | B60H 1/345 | 454/155 |
| 6,685,555 B1 * | 2/2004 | Davis, Jr. | B60H 1/3421 | 454/155 |
| 6,893,338 B2 * | 5/2005 | Katagiri | B60H 1/3421 | 454/155 |
| 8,267,020 B2 * | 9/2012 | Mann | F23C 5/02 | 110/104 B |
| 9,513,027 B2 * | 12/2016 | Londiche | F24F 13/10 | |
| 9,539,882 B2 * | 1/2017 | Takai | B60H 1/3421 | |
| 2003/0050001 A1 * | 3/2003 | Kamio | B60H 1/345 | 454/155 |
| 2003/0157880 A1 * | 8/2003 | Nishida | B60H 1/3414 | 454/155 |
| 2004/0038643 A1 * | 2/2004 | Katagiri | B60H 1/3421 | 454/314 |
| 2004/0127153 A1 * | 7/2004 | Demerath | B60H 1/3421 | 454/155 |
| 2009/0277364 A1 * | 11/2009 | Donais | F23C 7/008 | 110/263 |
| 2011/0048293 A1 * | 3/2011 | Grusha | F23D 1/00 | 110/261 |
| 2011/0146545 A1 * | 6/2011 | Morse | F23D 1/00 | 110/327 |
| 2011/0319005 A1 * | 12/2011 | Sawada | B60H 1/00678 | 454/155 |
| 2013/0078900 A1 * | 3/2013 | Zalan | B60H 1/3421 | 454/152 |
| 2014/0120823 A1 * | 5/2014 | Brinas | B60H 1/34 | 454/155 |
| 2015/0065031 A1 * | 3/2015 | Shibata | B60H 1/3421 | 454/322 |
| 2015/0328959 A1 * | 11/2015 | Suzuki | B60H 1/3421 | 454/155 |
| 2017/0021692 A1 * | 1/2017 | Terai | B60H 1/0065 | |
| 2017/0057328 A1 * | 3/2017 | Sano | B60H 1/3442 | |
| 2017/0356643 A1 * | 12/2017 | Ristic | F23D 1/00 | |

FOREIGN PATENT DOCUMENTS

| | | |
|---|---|---|
| DE | 102011050435 A1 | 11/2012 |
| DE | 202013100257 | 3/2013 |
| DE | 102013102866 B3 | 6/2014 |
| EP | 1712384 A2 | 10/2006 |
| FR | 2809349 A1 | 11/2001 |

OTHER PUBLICATIONS

PCT Search Report and Written Opinion of the International Searching Authority dated Feb. 29, 2016 for PCT application No. PCT/EP2015/076157, 5 pages.

PCT Internatioanl-Type Search Report dated Nov. 5, 2015 for National application No. 1451348-5, 6 pages.

* cited by examiner

AIR NOZZLE DEVICE FOR A VEHICLE

This application is a continuation of PCT International Application No. PCT/EP2015/076157, filed Nov. 10, 2015, which claims foreign priority to Sweden Application No. SE 1451348-5, filed on Nov. 10, 2014, both of which are incorporated herein by reference.

TECHNICAL FIELD

The invention relates to an air nozzle device for a vehicle. The invention also relates to a vehicle compartment member such as dashboard, door trim, console or the like, comprising an air nozzle device. Moreover, the invention relates to a vehicle comprising a vehicle compartment member having an air nozzle device.

The invention can be arranged in a dashboard, a door trim, a rear seat console or the like. Although the invention will be described in relation to a car, the invention is not restricted to this particular vehicle, but may as well be installed in other type of vehicles such as minivans, recreational vehicles, off-road vehicles, trucks, buses or the like.

BACKGROUND ART

In the field of air valves and ventilation systems, there is an increasing demand for improving the robustness and operation of the components. Ventilation systems for vehicles are increasingly complex as the demands on the degree of control of such systems increase. Heating, ventilation and air conditioning (HVAC) systems are typically used to control the environment in a vehicle such that desired interior conditions set by the operator are maintained irrespective of the exterior environment. The vehicle air ventilation system is typically connected to one or several air valves, vents, nozzles or the like in order to discharge a flow of air within a vehicle compartment. In many systems, the ventilation system is connected to the air valve via an air duct. Furthermore, the air valve is often installed in a vehicle compartment member such as a dashboard, and thereby defines the interface between the ventilation system and the vehicle compartment.

Depending on the wishes of the passenger in the vehicle, the air valve may be adjusted in the horizontal direction and/or the vertical direction in order to discharge the air from the air valve in different directions. One example of an air nozzle is disclosed in WO 2008/077655 A1, in which a con-shaped air directing member is arranged to direct the air flow from the air outlet opening. In addition, the air nozzle comprises a slider and a plug formed on the slider to cover an air inlet opening. The slider is further moveable in axial direction of the device in order to open and close the air inlet opening by means of the plug. The slider is provided with a manipulator, which is movable in the axial direction and rotational about a longitudinal axis of the slider. However, due to an increasing demand for reducing weight and size of the components making up the device and the system, it is often required to keep a balance between the functions provided by the device and the size of the air nozzle device.

Thus, it has been observed that there is a demand for an advanced air nozzle device which is capable of meeting the requirements as to size and available space in a vehicle compartment member, such as a dashboard, while providing good adjustment possibilities to the user.

SUMMARY OF THE INVENTION

A general object of the present invention is to provide a multi-functional air nozzle device for a vehicle which is user-friendly, yet compact and robust.

This and other objects, which will become apparent in the following, are accomplished by an air nozzle device for vehicle as defined in the accompanying independent claim. Details of some example embodiments and further optional features are recited in the associated dependent claims.

According to a first aspect of the present invention, there is provided an air nozzle device for a vehicle which comprises a housing defining an interior volume and having an air inlet at one side, an air discharge opening at a second side and an air flow channel through the housing for transporting a flow of air between the air inlet and the air discharge opening.

The device further comprises a user-actuated manual mechanism, a moveable first linkage assembly, a moveable second linkage assembly, a shutoff mechanism configured to regulate the air flow, a first air flow adjustment arrangement and a second air flow adjustment arrangement, each being pivotably connected to the housing and configured to adjust the direction of the air flow. The first linkage assembly is operatively connected to the user-actuated manual mechanism at one end and further configured to define a channel or groove to accommodate a part of a guiding member of the second air flow adjustment arrangement, wherein the channel or groove extends at least partly in the longitudinal direction to permit a movement of the first linkage assembly along the longitudinal direction X independently of the position of the air first air flow arrangement and the position of the second air flow adjustment arrangement, while an adjustment of the second air flow arrangement is effected by a movement of the first linkage assembly in a transverse direction Y.

The second linkage assembly is operatively connected to the user-actuated manual mechanism and configured to effect a regulation of the air flow by the shutoff mechanism via a movement of said user-actuated manual mechanism along the longitudinal direction X. Moreover, the user-actuated manual mechanism is configured to permit manual operation of the first air flow adjustment arrangement, the second air flow adjustment and the shutoff mechanism from the outside of the device.

In this way, it becomes possible to provide a multi-functional air nozzle device with a configuration, as described above, which allows for an independent adjustment of the air flow in the vertical direction, an independent adjustment of the air flow in the horizontal direction and an independent regulation of the air flow level.

As the first linkage assembly is operatively connected to the user-actuated manual mechanism, an adjustment of the second air flow adjustment arrangement is effected by a movement of the first linkage assembly and the user-actuated manual mechanism in a transverse direction. As the user-actuated manual mechanism is configured to permit manual operation of the first air flow adjustment arrangement, an adjustment of the first air flow adjustment arrangement is effected by a movement of the user-actuated manual mechanism in a vertical direction Z. As the second linkage assembly is operatively connected to the user-actuated manual mechanism, a movement of the shutoff mechanism is effected by a movement of the second linkage assembly and the user-actuated manual mechanism in the longitudinal direction X. To this end, the device provides a multi-functional solution which is both compact and robust while allowing for an integrated push/pull function via the second linkage assembly and the user-actuated manual mechanism that is adapted to be operable from the outside of the device.

The air nozzle device is compact and robust in the sense that the device can be installed in a vehicle compartment member such as a dashboard without any further modifications of the dashboard more than providing a space of the device, and without any further installations of a separate user-actuated mechanism since the user-actuated manual mechanism is directly connected to a part of the device and capable of being manipulated in a convenient manner by the user to effect a regulation and/or adjustment by moving the mechanism in the longitudinal, transverse and/or the vertical direction.

In one example embodiment, the direction of the air flow in the horizontal direction is adjusted by means of a horizontal air flow adjustment arrangement and the direction of the air flow in the vertical direction is adjusted by means of a vertical air flow adjustment arrangement. Accordingly, in one example embodiment, the first air flow adjustment arrangement is a vertical air flow adjustment arrangement for adjusting the air flow in the vertical direction Z and the second air flow adjustment arrangement is a horizontal air flow adjustment arrangement for adjusting the air flow in the horizontal direction X.

By a manipulation of the user-actuated manual mechanism, a user is capable of independently adjusting the vertical air flow adjustment arrangement by a movement of the user-actuated manual mechanism and the first linkage assembly along the vertical direction Z, independently adjusting the horizontal air flow adjustment arrangement by a movement of the user-actuated manual mechanism and the first linkage assembly along the transverse direction Y, and independently regulating the air flow via the shutoff mechanism by a movement of the user-actuated manual mechanism and the second linkage assembly along the longitudinal direction X.

In contrast to hitherto known air nozzle solutions, which only allows for a regulation of the air flow between a closed position to an open position, i.e. from 0 to 100% air flow discharge, when the direction of the air flow adjustment is in a nominal position, the invention provides an air nozzle device which is capable of regulating the air flow between a closed position to an open position in all available positions of the first air flow directing adjustment arrangement and second air flow directing adjustment arrangement, e.g. via the horizontal air flow adjustment arrangement and the vertical air flow adjustment arrangement. In other words, the vertical air flow adjustment and the horizontal air flow adjustment can be controlled independently of the position of the air regulation mechanism, i.e. the shutoff mechanism.

In addition, the invention provides the possibility of installing the air nozzle device either in a circular cross-sectional housing or in a rectangular cross-sectional housing.

To this end, the device provides a multi-functional solution which is both compact and robust while allowing for an integrated push/pull function via the user-actuated manual mechanism that is operable from the outside of the device.

Merely as an example, when the first air flow adjustment arrangement is a vertical air flow adjustment arrangement for adjusting the air flow in the vertical direction Z and the second air flow adjustment arrangement is a horizontal air flow adjustment arrangement for adjusting the air flow in the horizontal direction X, any one of the vertical air flow adjustment arrangement, the horizontal air flow adjustment arrangement and the shutoff mechanism can be independently operated within the device. Accordingly, the device provides a multi-functional solution in the sense that the air regulation, the vertical air flow adjustment and the horizontal air adjustment can be independently controlled, or adjusted.

Typically, the channel or groove of the first linkage assembly extends at least partly in the longitudinal direction X to permit a movement of the first linkage assembly along the longitudinal direction X independently of the position of the second (horizontal) air flow adjustment arrangement, while an adjustment of the second (horizontal) air flow adjustment arrangement is effected by a movement of the first linkage assembly in the transverse direction Y independently of the position of the shutoff mechanism and the first air flow adjustment arrangement.

In one example embodiment, the first air flow adjustment arrangement comprises a first module and a second module. The first module being configured to move relative said second module along the longitudinal direction X. Further, said second linkage assembly is operatively connected to said user-actuated manual mechanism via said first module of said first air flow adjustment arrangement and configured to effect a regulation of the air flow by the shutoff mechanism by a movement of said user-actuated manual mechanism and said first module along the longitudinal direction X. Thus, as the second linkage assembly here is operatively connected to the user-actuated manual mechanism via the first module, it is appreciated that also the first module moves in the longitudinal direction upon a manipulation of the user-actuated manual mechanism along the longitudinal direction of the device.

To this end, the term "independently" typically refers to the principle that one component (e.g. the horizontal air flow adjustment), or several components, can be maintained in its position when another different component (e.g. the shutoff mechanism) is adjusted via the user-actuated manual mechanism. As an example, the second (horizontal) air flow adjustment arrangement can be maintained in its position, since the guiding member of the second (horizontal) air flow adjustment arrangement is freely movable in the longitudinal direction X of the recess of the first linkage assembly. In other words, the position of the horizontal air flow adjustment arrangement is also unaffected by an adjustment of the shutoff mechanism (effected by a movement of the second linkage assembly).

Moreover, as the second linkage assembly is operatively connected to the user-actuated manual mechanism via the first module (movable relative to the second module) of the first air flow adjustment arrangement and configured to effect a regulation of the air flow by the shutoff mechanism by a movement of said user-actuated manual mechanism along the longitudinal direction, the regulation of the air flow by the shutoff mechanism can be performed independently of the position of the second air flow arrangement and independently of the position of the first air flow adjustment arrangement as seen in the vertical and the transverse direction. That is, due to configuration of the second linkage assembly and the configuration of the first linkage assembly, which allows the guiding member of the second (horizontal) air flow adjustment arrangement to freely move in the longitudinal direction X of the recess of the first linkage assembly, only the regulation of the air flow by the shutoff mechanism is effected by a movement of the second linkage assembly, the user-actuated manual mechanism and the first module along the longitudinal direction. It this context, it is to be noted that a movement of the first module of the first air flow adjustment arrangement in the longitudinal direction X is translated into a movement of the second linkage assembly to effect a regulation of the air flow by the shutoff mechanism. A movement of these components along the longitudinal direction is possible independently of the position of the (second) horizontal air flow adjustment arrangement.

In addition, the position of the shutoff mechanism is unaffected by an adjustment of the second (horizontal) air flow adjustment arrangement. Also, the position of the shutoff mechanism is unaffected by an adjustment of the first (vertical) air flow adjustment arrangement in the vertical direction Z. That is, by an adjustment of the first linkage assembly along the transverse direction Y and/or by an adjustment of the user-actuated manual mechanism about a transverse axis.

Accordingly, when the first air flow adjustment arrangement is e.g. a vertical air flow adjustment arrangement and the second air flow adjustment arrangement is e.g. a horizontal air flow adjustment arrangement, the user-actuated manual mechanism is capable of independently adjusting the vertical air flow adjustment arrangement by a movement of the first linkage assembly along the vertical direction Z, independently adjusting the horizontal air flow adjustment arrangement by a movement of the first linkage assembly along the transverse direction Y, and independently regulating the air flow via the shutoff mechanism by a movement of the user-actuated manual mechanism and the second linkage assembly along the longitudinal direction X. It is to be noted that by a movement of the first linkage assembly along the vertical direction Z typically means a movement of the user-actuated manual mechanism about its transverse axis, which will also result in a movement of the first linkage assembly along the vertical direction Z.

In this context of the invention, the term "independently" typically refers to the principle that one component (e.g. the horizontal air flow adjustment) can be maintained in its position when another component (e.g. the shutoff mechanism) is adjusted via the operating member.

In an example embodiment, the user-actuated manual mechanism is slidably engaged to the first module of the first air flow adjustment arrangement and configured to be movable along the longitudinal direction X and the transverse direction Y upon operation of a user. Typically, the user-actuated manual mechanism is also configured to pivot about a transverse axis in order to adjust the vertical air flow adjustment arrangement. Hence, the user-actuated manual mechanism is also configured to be movable in the vertical direction Z.

As an example, the user-actuated manual mechanism is slidably engaged to the vertical air flow adjustment arrangement and movable along the longitudinal direction X and the transverse direction Y upon operation of a user.

In an example embodiment the second linkage assembly is configured to adjust the position of the shutoff mechanism upon a movement of the second linkage assembly in the longitudinal direction X, and further configured to remain in position, as seen in the longitudinal direction X, upon an adjustment of the first linkage assembly in the transverse direction Y and/or in the vertical direction Z.

In an example embodiment, the second linkage assembly comprises a movable linkage member and a guiding member connected to the housing. The linkage member is adapted at a first end to cooperate with the guiding member of the second linkage assembly and at a second end to cooperate with the shutoff mechanism so that a movement of the first module of the first air flow adjustment arrangement is transferred into a movement of said linkage member along the longitudinal direction X to effect a regulation of the air flow by the shutoff mechanism.

In an example embodiment, the guiding member of the second linkage assembly is configured to allow for a displacement of the first module along the transverse direction Y.

In an example embodiment, the first air flow adjustment arrangement further comprises an interconnecting member for connecting said first module and said second module of said first air flow adjustment arrangement.

In an example embodiment, the first (vertical) air flow adjustment arrangement is independently pivotably connected to the housing via at least one pivoting connection configured to permit at least a part of the first (vertical) air flow adjustment arrangement to pivot about a transverse pivot axis.

In an example embodiment, the vertical air flow adjustment arrangement comprises a set of spaced apart air directing elements in the form of blades or flanges pivotably arranged about the pivoting connection(s).

In an example embodiment, the user-actuated manual mechanism is slidably engaged to the vertical air flow adjustment arrangement to permit operation of the user-actuated manual mechanism along the longitudinal direction X and the transverse direction Y, upon operation of a user, independently of the position of the vertical air flow adjustment, while an adjustment of the vertical air adjustment is effected by a movement of the user-actuated manual mechanism in the vertical direction Z, typically referring a rotation of the user-actuated manual mechanism about a transverse axis.

Typically, the horizontal air flow adjustment arrangement is independently pivotably connected to the housing via at least one pivoting connection configured to permit the horizontal air flow adjustment arrangement to pivot about a vertical pivot axis.

In an example embodiment, the horizontal air flow adjustment arrangement comprises a set of spaced apart air directing elements in the form of blades or flanges pivotably arranged about the pivoting connection(s).

As the second air flow adjustment arrangement is typically the horizontal air flow adjustment arrangement, the guiding member is arranged on the horizontal air flow adjustment arrangement. Thus, in one example embodiment, the horizontal air flow adjustment comprises the guiding member.

In an example embodiment, the first linkage assembly is arranged spaced apart from the second linkage assembly within said housing. Typically, the first linkage assembly is arranged spaced apart from the second linkage assembly on the first air flow arrangement as seen in the transverse direction Y.

In an example embodiment, the device further comprises a third linkage assembly. Said second linkage assembly and said third linkage assembly being arranged on opposite ends of the air flow adjustment arrangement, as seen in the transverse direction Y. Moreover, the third linkage assembly is operatively connected to said user-actuated manual mechanism and configured to effect a regulation of the air flow via the shutoff mechanism by a movement of said user-actuated manual mechanism along the longitudinal direction X.

In an example embodiment, the shutoff mechanism is configured to move between an open position, defining a passage for the air flow in the air flow channel, and a closed position, defining an essentially air tight configuration against (or with) the inner surfaces of the housing, upon a movement of the second linkage assembly in the longitudinal direction.

In other words, the shutoff mechanism is typically operable between an open position, in which essentially all air upstream from the shutoff mechanism passes through the shutoff mechanism, and a closed position, in which the shutoff mechanism forms an air tight configuration with an inner surface of the housing, upon movement of the second linkage assembly in the longitudinal direction X.

In an example embodiment, the shutoff mechanism is connected to the housing. As an example, the shutoff mechanism is pivotably connected to the housing. The shutoff mechanism can be pivotably connected to the housing by means of a rotational arranged supporting member extending between shutoff mechanism and the inner surface of the housing. Typically, the shutoff mechanism is connected to the housing via at least one pivoting connection configured to permit said shutoff mechanism to pivot about one or several transverse pivot axis.

In an example embodiment, the shutoff mechanism comprises a set of blades being moveable between an open position in which the set of blades forms a passage for the air flow in the air flow channel and a closed position in which the set of blades are adapted to form an essentially air tight configuration against (or with) the inner surfaces of the housing.

Typically, the user-actuated manual mechanism is capable of open/close the shutoff mechanism via a movement of the second linkage assembly and the first module of the first air flow adjustment arrangement along the longitudinal direction X.

Typically, the user-actuated manual mechanism is capable of independently adjusting the directions of the air flow via the air flow adjustment arrangements, while maintaining the position of the shutoff mechanism, by a movement of the first linkage assembly along the transverse direction Y or the vertical direction.

In one example embodiment, the user-actuated manual mechanism is capable of independently adjusting the vertical air flow adjustment arrangement by a movement of the first linkage assembly along the vertical direction Z, independently adjusting the horizontal air flow adjustment arrangement by a movement of the first linkage assembly along the transverse direction Y, and independently regulating the air flow via the shutoff mechanism by a movement of second linkage assembly along the longitudinal direction X.

According to one example embodiment, the first air flow arrangement further comprises an alignment member having a guiding surface adapted to engage with a corresponding guiding surface of the first module of the air flow arrangement. The guiding surface engages with the corresponding guiding surface of the first module of the air flow arrangement when said first module is moved towards the alignment member, as seen in the in longitudinal direction X. Typically, the guiding surface may define a conical-shaped surface.

According to design variant, there is provided an air nozzle device for a vehicle comprising a housing defining an interior volume and having an air inlet at one side, an air discharge opening at a second side and an air flow channel through the housing for transporting a flow of air between the air inlet and the air discharge opening, the device further comprising a first air flow adjustment arrangement pivotably connected to said housing and configured to adjust the direction of the air flow, wherein said first air flow adjustment arrangement comprises a first module and a second module, said first module being configured to move relative said second module along the longitudinal direction, and wherein the first air flow arrangement further comprises an alignment member having a guiding surface adapted to engage with a corresponding guiding surface of the first module of the air flow arrangement. Typically, the guiding surface defines a conical-shaped surface.

The features of this design variant may include any feature or function as mentioned above with respect to the first aspect of the invention, i.e. the aspects relating to the air nozzle device as described herein.

The invention also relates to a vehicle compartment member such as dashboard, door trim, console or the like, wherein the vehicle compartment member comprises an air nozzle device according to the aspect and/or any one of the example embodiments as mentioned above with respect to the first aspect of the invention, i.e. the aspects relating to the air nozzle device.

The invention also relates to a vehicle comprising vehicle compartment member according to any one of the aspects and/or example embodiments as mentioned above with respect to the vehicle compartment and/or the first aspect of the invention, i.e. the aspect relating to the air nozzle device.

By the term "operatively connected" means that a component is in operative relation to another component.

Further features of, and advantages with, the present invention will become apparent when studying the appended claims and the following description. The skilled person realize that different features of the present invention may be combined to create embodiments other than those described in the following, without departing from the scope of the present invention. As an example, although the first air flow adjustment arrangement is a vertical air flow adjustment arrangement and the second air flow adjustment arrangement is a horizontal air flow adjustment arrangement, it is also possible that the opposite arrangement can be provided, i.e. the first air flow adjustment arrangement is a horizontal air flow adjustment arrangement and the second air flow adjustment arrangement is a vertical air flow adjustment arrangement. In addition, it might also be possible that the first air flow adjustment arrangement and the second air flow adjustment arrangement are provided as an integral air flow adjustment assembly.

BRIEF DESCRIPTION OF THE DRAWINGS

The various example embodiments of the invention, including its particular features and example advantages, will be readily understood from the following illustrative and non-limiting detailed description and the accompanying drawings, in which.

DETAILED DESCRIPTION OF EXAMPLE EMBODIMENTS OF THE INVENTION

Figure 1A:
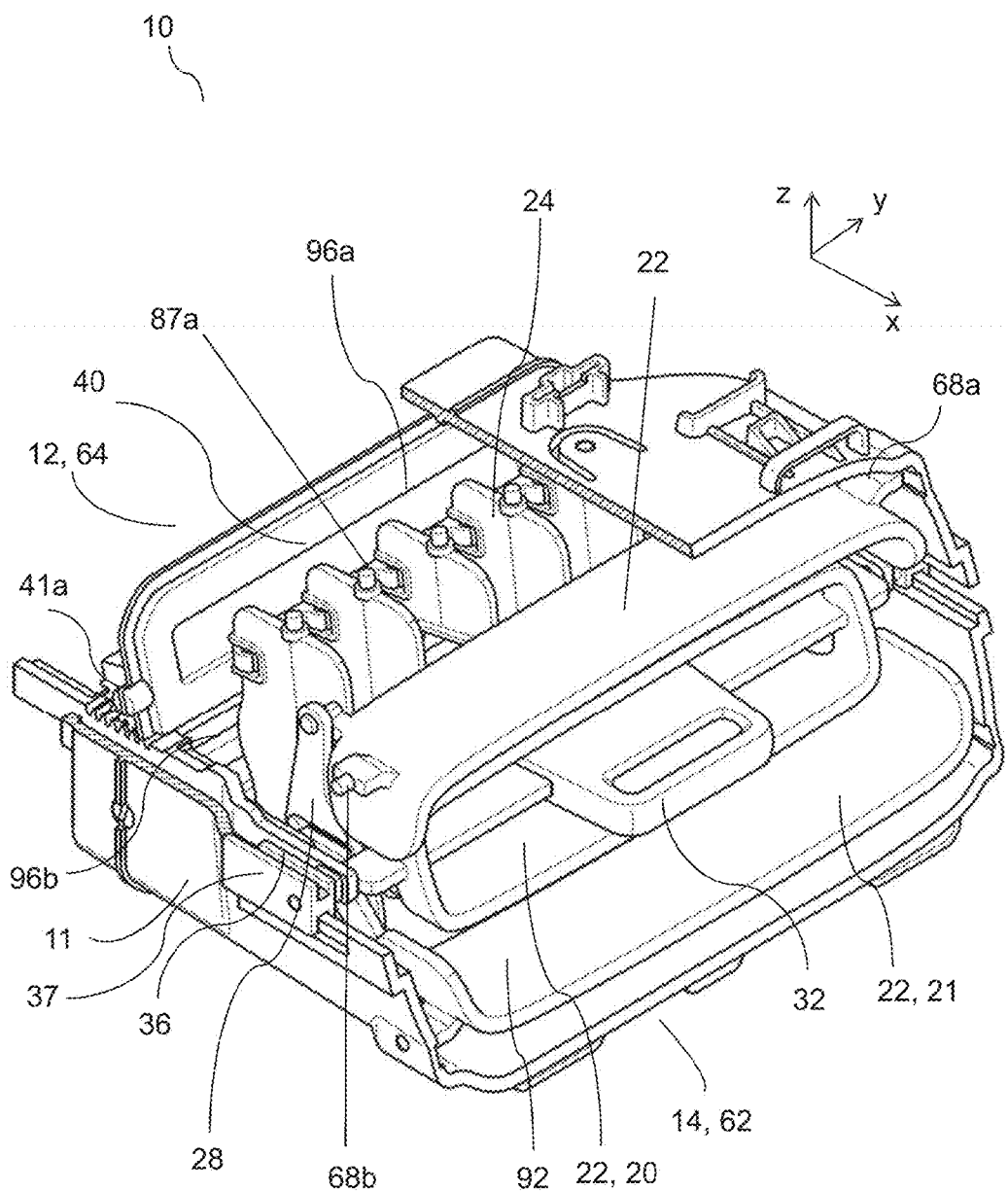
FIG. 1a is an isometric view of a partial section of a first example embodiment of an air nozzle device for a vehicle according to the present invention, wherein the air nozzle device is in an assembled configuration.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference characters refer to like elements throughout the description. The drawings are not necessarily to scale and certain features may be exaggerated in order to better illustrate and explain the exemplary embodiments of the present invention.

Referring now to the figures and FIG. 1a-1d in particular, there is depicted a vehicle air nozzle device to be installed in a vehicle compartment member in the form of a dashboard of a vehicle such as a car. Accordingly, the vehicle compartment is provided with an air nozzle device according to an example embodiment, as described hereinafter. The vehicle 1 (not shown) thus includes the vehicle compartment member in the form of a dashboard 100 (not shown) provided with an air nozzle device 10. The air nozzle device 10 is described in further detail below with reference to FIGS. 1a-1d, FIGS. 2a-2d, FIGS. 3a-3j and FIGS. 4a-4c. The vehicle 1 is provided in the form of a car. Moreover, the instrument panel 100 is arranged in a vehicle compartment of the car. The arrangement, components and functions of the dashboard (instrument panel) are well-known in the art, and are therefore not further described herein. In addition, it should be readily appreciated that an instrument panel (sometimes denoted as a dashboard) is only one example of several different vehicle compartment members, and it is therefore possible that the invention can be installed and arranged in other vehicle compartment members such as in a door trim, rear end of a floor console, B-pillar, tunnel console or the like. In addition, the vehicle compartment member can be arranged and installed in any type of vehicle such as a truck, bus and the like.

Figure 1B:
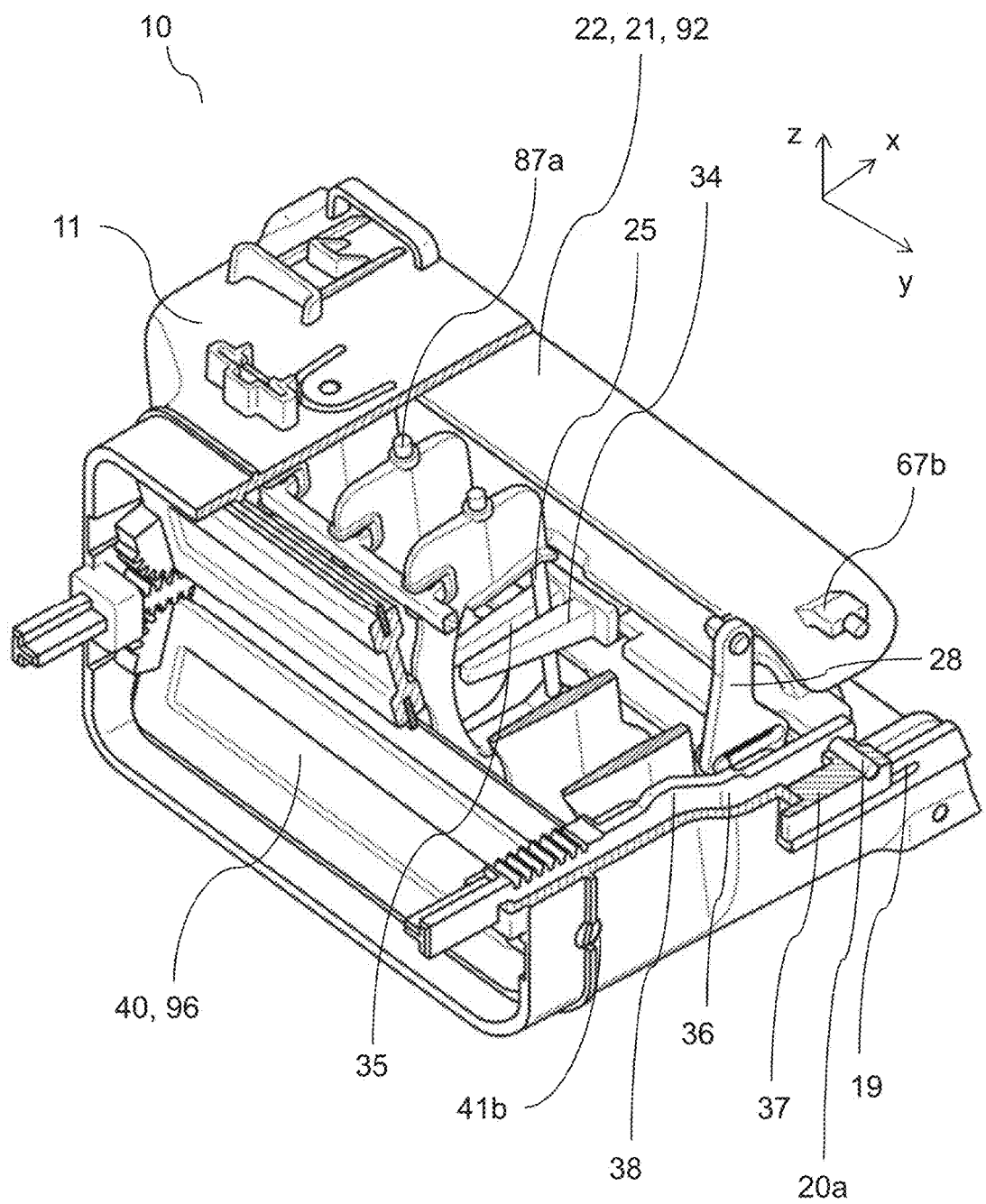
FIG. 1b is another isometric view of a partial section of the first example embodiment of the air nozzle device in FIG. 1a, wherein the air nozzle device is in an assembled configuration.
Figure 1C:
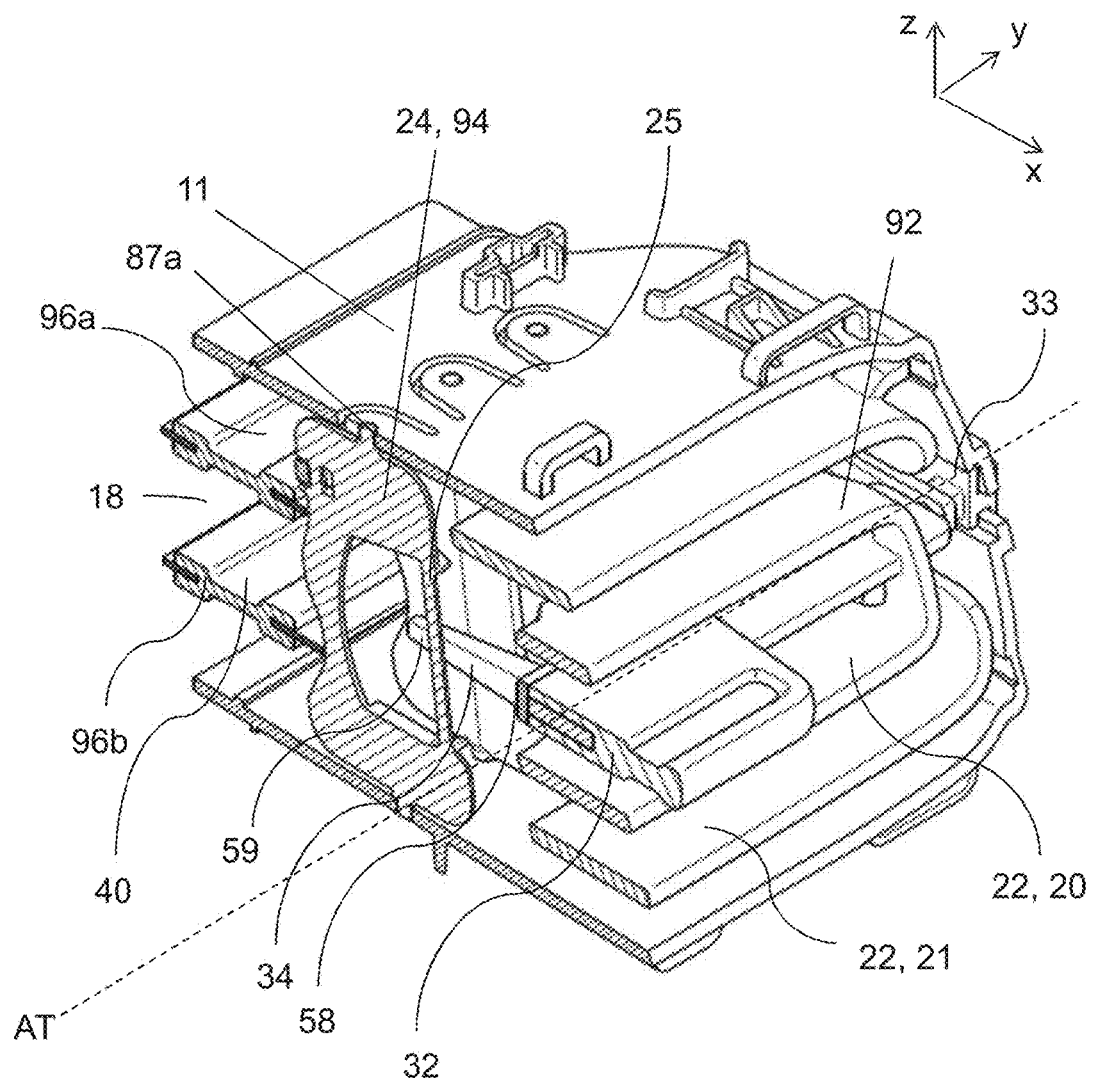
FIG. 1c is a cross-sectional view of the first example embodiment of the air nozzle device in FIG. 1a, wherein the air nozzle device is in an assembled configuration.
Figure 1D:
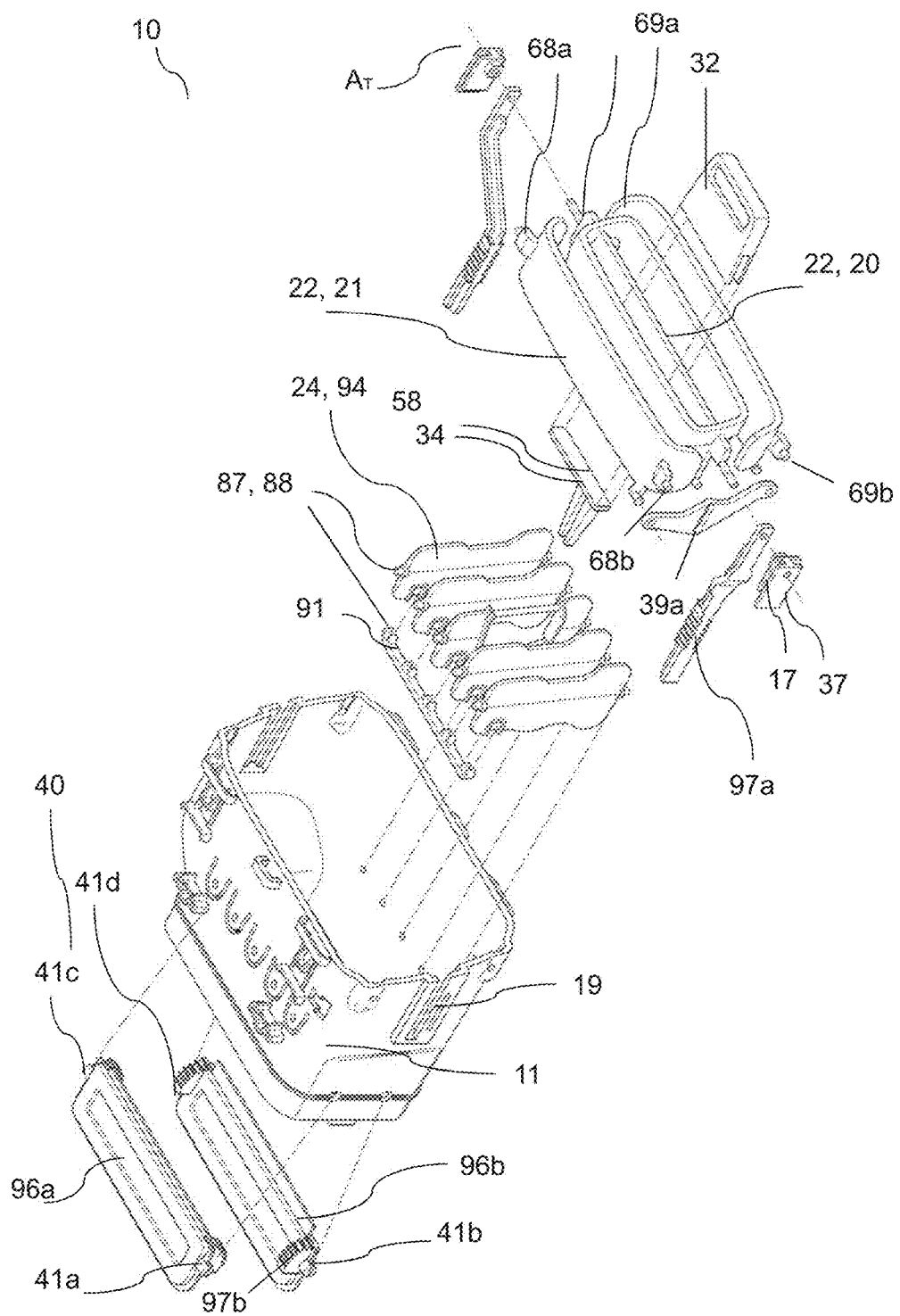
FIG. 1d is an exploded view of the first example embodiment of the air nozzle device in FIGS. 1a to c.

Turning now to FIGS. 1a to 1d, an example embodiment of an air nozzle device of a vehicle is illustrated. FIGS. 1a and 1b are isometric views of partial sections of the example embodiment of an air nozzle device according to the present invention, whilst FIG. 1c is a cross-sectional view of the example embodiment of the air nozzle device in FIGS. 1a and 1b. In FIGS. 1a-1c, the air nozzle device is in an assembled configuration, whilst FIG. 1d shows an exploded view of the components of the example embodiment of the air nozzle device, i.e. an disassembled configuration of the device.

In this example embodiment, as shown in FIGS. 1a-1d, the air nozzle device 10 comprises a housing 11 defining an interior volume. The interior volume may have an inner surface extending in the direction X, Y and Z. Thus the housing here is defined by an inner surface. The inner surface is typically encircling at least a part of an air flow channel 18 extending through the housing 11. The housing in this example embodiment has an extension in the longitudinal (horizontal) direction X, an extension in the transverse direction Y and an extension in the vertical direction Z. The device is typically installed in a horizontal orientation in the vehicle. It should be readily appreciated that the directions are only provided for ease of understanding, and refers to the directions of the device and the housing when the device is installed in an essentially plane configuration in the vehicle. In other words, the directions may not be essentially horizontal and vertical in a configuration when the device (and the housing) is installed in an angled position. Alternatively, the device can be installed in an essentially vertical orientation in the vehicle. As such, the directions should be construed to refer to the directions of the device and the air flow when the device is in an essentially plane installation in a vehicle. The shape of the housing is in this example embodiment a three-dimensional shape having a rectangular cross-section. However, other shapes are conceivable such as a three-dimensional shape having a circular cross-section, i.e. a cylinder. It is even possible that the shape of the housing is provided in the form of a bowl.

In all example embodiments as shown in the Figures herein, the housing has an air inlet 12 at one side 64, an air discharge opening 14 at a second side 62 and an air flow channel 18 through the housing 11 for transporting a flow of air between the air inlet 12 and the air discharge opening 14. The air inlet is typically connected to an air duct (not shown), which is connected to e.g. an air ventilation system, air conditioning system, air heating system or the like. Thus, the air nozzle device can be considered as the interface between the air ventilation system (or the air conditioning system or the air heating system) and the vehicle compartment. Accordingly, the air inlet 12 is arranged upstream of the air discharge opening 14, as seen in a longitudinal direction X. In other words, the air discharge opening is arranged downstream of the air inlet 12, as seen in a longitudinal direction X.

The air inlet 12 is configured for receipt of air from an air duct (not shown). The air discharge opening 14 is configured for discharging air into the vehicle compartment. The air flow channel 18 is configured for transporting the flow or air through the housing 11.

As will be readily appreciated from the description herein, the air nozzle device is configured for distributing and directing a flow of air within the vehicle compartment. In addition, the air nozzle device is configured for regulating the level of air, as described below.

Moreover, the device 10 further comprises a user-actuated manual mechanism 32, a moveable first linkage assembly 34, a moveable second linkage assembly 36, a shutoff mechanism 40 configured to regulate the air flow, a first air flow adjustment arrangement 22 and a second air flow adjustment arrangement 24, each being pivotably connected to said housing and configured to adjust the direction of the air flow. Hence, the first air flow adjustment arrangement 22 is pivotably connected to the housing and configured to adjust the direction of the air flow. Analogously, the second air flow adjustment arrangement 24 is pivotably connected to the housing and configured to adjust the direction of the air flow.

Further details of the user-actuated manual mechanism 32, moveable first linkage assembly 34 and the moveable second linkage assembly 36 will be described in relation to FIGS. 1d, 2a to 2d.

In this example embodiment, as shown in FIGS. 1a to 1d, the shutoff mechanism 40 is configured to regulate the air flow. Typically, the shutoff mechanism is pivotably connected to the housing 11. Alternatively, or in addition, the shutoff mechanism may be connected to the housing 11 via the second linkage assembly 36.

In the example embodiment as shown in FIGS. 1a-1d, when the first air flow adjustment arrangement is a vertical air flow adjustment arrangement 22 and the second air flow adjustment arrangement is a horizontal air flow adjustment arrangement 24, the vertical air flow adjustment arrangement 22 is separately pivotably connected to the housing 11 and configured to adjust the direction of the air flow in the vertical direction z, while the horizontal air flow adjustment arrangement 24 is separately pivotably connected to the housing 11 and configured to adjust the direction of the air flow in a horizontal (longitudinal) direction x.

Accordingly, the device as shown in the figures here comprises the vertical air flow adjustment arrangement 22 for adjusting the air flow in the vertical direction Z and the horizontal air flow adjustment arrangement 24 for adjusting the air flow in the horizontal direction X.

It is to be noted that typically, although not strictly required, the first air flow adjustment arrangement 22 and the second air flow adjustment arrangement 24 in this example embodiment, as described in relation to the FIGS. 1a through 1d, FIGS. 2a-2b and FIGS. 3a through 3j, are separate components and spaced apart as seen in the longitudinal direction X.

Moreover, as illustrated in FIGS. 1a and 1d, the device 10 comprises the user-actuated manual mechanism 32, the first linkage assembly 34 and the second linkage assembly 36. The first linkage assembly 34 is operatively connected to the user-actuated manual mechanism 32 at one end 58, as is also shown in FIG. 1d or 2a.

Figure 2A:
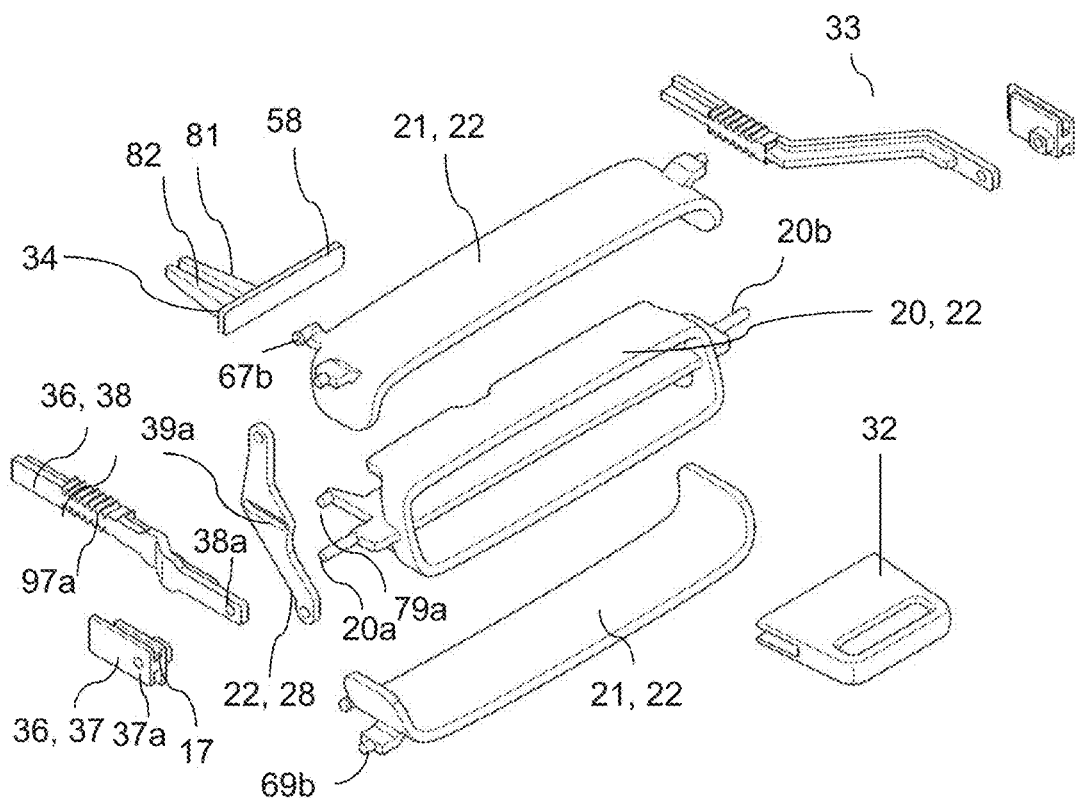
FIG. 2a is an exploded view of some of the components illustrated in FIG. 1d, according to an example embodiment of the present invention.

As an example, the first linkage assembly may resemble the form of a fork or the like, as shown in FIG. 2a. Hence, the first linkage assembly here includes two members 81, 82, which are arranged in a fork-like configuration.

The first linkage assembly 34 comprises a channel or groove 35 to accommodate a part of a guiding member 25 of the second air flow adjustment arrangement 24. In other words, the second air flow adjustment arrangement 24 comprises the guiding member 25. Further, the channel or groove 35 extends at least partly in the longitudinal direction X to permit a movement of the first linkage assembly 34 along the longitudinal direction X independently of the position of the first air flow arrangement 22 and the position of the second air flow adjustment arrangement 24, while an adjustment of the second air flow arrangement 24 is effected by a movement of the first linkage assembly 34 in the transverse direction Y. As will be further described herein, the configuration of the second linkage assembly provides that the adjustment of the second air flow arrangement 24, effected by a movement of the first linkage assembly 34 in the transverse direction Y, can be performed independently of the position of the shutoff mechanism 40.

If the first linkage assembly includes the members 81, 82 to form a fork like configuration, the guiding member 25 is oriented essentially in the vertical direction and arranged to freely move in-between the two members 81, 82 except in the transverse direction Y.

In the example embodiment, as shown in the Figures, i.e. when the first air flow adjustment arrangement is the vertical air flow adjustment arrangement 22 and the second air flow adjustment arrangement is the horizontal air flow adjustment arrangement 24, the horizontal air flow mechanism 24 comprises the guiding member 25. Further, in this example embodiment, the first linkage assembly 34 comprises the channel or groove 35 to accommodate a part of the guiding member 25 of the horizontal air flow adjustment arrangement 24.

Thus, the channel or groove 35 extends at least partly in the longitudinal direction X to permit a movement of the first linkage assembly 34 along the longitudinal direction X independently of the position of the horizontal air flow adjustment arrangement 24, while an adjustment of the horizontal air flow adjustment arrangement 24 is effected by a movement of the first linkage assembly 34 in the transverse direction Y independently of the position of the shutoff mechanism 40. The first linkage assembly 34 is configured to cooperate with the guiding member 25 to adjust the horizontal air flow adjustment arrangement 24 upon a movement of the first linkage assembly 34 in the transverse direction Y.

To this end, the term "independently" typically refers to the principle that one component (e.g. the horizontal air flow adjustment), or several components, can be maintained in its position when another component (e.g. the shutoff mechanism) is adjusted via the user-actuated manual mechanism. In other words, the horizontal air flow adjustment arrangement 24 is maintained in its position, since the guiding member 25 is freely movable in the longitudinal direction X of the recess 35, when the first linkage assembly 34 is moved in the longitudinal direction X. In other words, the position of the horizontal air flow adjustment arrangement 24 is unaffected by an adjustment of the shutoff mechanism 40 by a movement of the second linkage assembly 36. Further, the position of the horizontal air flow adjustment arrangement 24 is unaffected by an adjustment of the vertical air flow adjustment arrangement 22 along the vertical direction since the guiding member 25 is freely movable in the vertical direction Z of the recess 35.

Typically, although not strictly required, the first air flow adjustment arrangement 22 comprises a first module 20 and a second module 21, as shown in e.g. FIG. 2a. The first module is configured to move relative the second module along the longitudinal direction X. The configuration to provide a movable arrangement between the first module and the second module is provided, as an example, by an interconnecting member 28 provided with a recess 39a for accommodating a guiding pin 79a of the first module. Hence, in this example embodiment, the first air flow adjustment arrangement 22 further comprises an interconnecting member 28 for operatively connecting the first module 20 and the second module 21 of the first air flow adjustment arrangement 22. The guiding pin projects from the first module of the first air flow adjustment arrangement. In addition, the interconnecting member 28 includes a recess 39a for accommodating a guiding pin 79a of the first module to permit the first module to move relative the second module along the longitudinal direction X. The recess 39a has a substantial extension in the longitudinal direction. Thus, the first module comprises the guiding pin 79a, as shown in FIG. 2a.

Due to the configuration, arrangement and cooperation between the guiding pin 79a of the first module and the recess 39a of the interconnecting member 28, the movement of the first module in the vertical direction (about a transverse axis) is transferred to a movement of the second module in the vertical direction (about a transverse axis). Thus the movement in the vertical direction of the first module effects the movement of the second module in the vertical direction. However, due to the longitudinal extension of the recess 39a, first module is allowed to move in the longitudinal direction without effecting the movement of the second module in the longitudinal direction.

The second linkage assembly 34 is operatively connected to the user-actuated manual mechanism 32 via the first module of the first air flow adjustment arrangement 22. In addition, the second linkage assembly is hereby configured to effect a regulation of the air flow by the shutoff mechanism 40 by a movement of the user-actuated manual mechanism 32 along the longitudinal direction X. The second linkage assembly 34 is operatively connected to the user-actuated manual mechanism 32 via a connecting pin 20a disposed on the first module, as shown in FIG. 2a. In other words, the connecting pin 20a is arranged to extend through an opening of the second linkage assembly. As such, the connecting pin 20a is arranged to extend through an opening of the guiding member 37 and through an opening of the linkage member 38 and then being pivotally connected to the housing. To this end, the connecting pin 20a is pivotally connected to the second linkage assembly and the housing. Thus, the first module is arranged to freely rotate about the transverse axis $A_T$ and within the second linkage assembly opening(s).

Figure 2B:
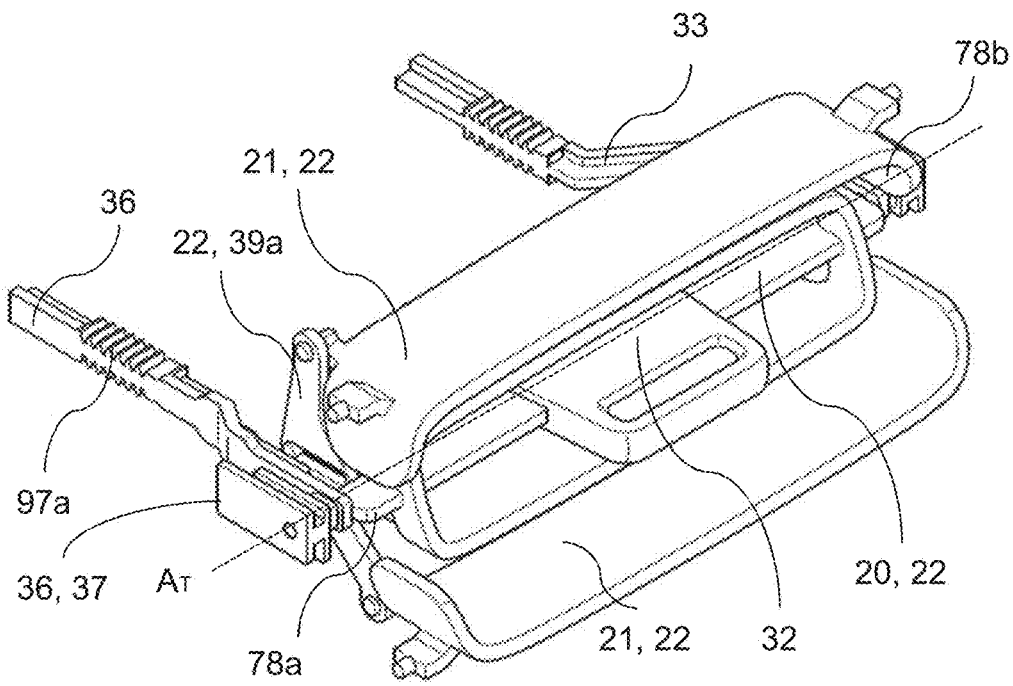
FIG. 2b is an isometric view of a partial section of the first example embodiment of the air nozzle device in FIG. 2a, in which the components in FIG. 2a are illustrated in an assembled configuration.

As illustrated in FIG. 2b, the second linkage assembly 36 is connected to an outer side area 78a of the first module of the first air flow adjustment arrangement 22. In the example embodiment illustrated in the Figures, e.g. FIG. 2b, the second linkage assembly 36 is configured to operatively connect to the connecting pin 20a projecting from the first module 20 of the arrangement 22. In this manner, the second linkage assembly 36 is capable of moving along the longitudinal direction X by means of cooperation between the connecting pin 20a and the second linkage assembly openings, i.e. an opening of the guiding member 37 and an opening of the linkage member 38.

To this end, the guiding member 37 comprises an opening 37a for receiving the connecting pin 20a. Analogously, the linkage member 38 comprises an opening 38a for receiving the connecting pin 20a.

One example of a configuration of the second linkage assembly 36 is illustrated in FIGS. 2a and 2b. The second linkage assembly is typically configured to adjust the position of the shutoff mechanism upon a movement of the second linkage assembly 36 in the longitudinal direction X, and further configured to remain in position, as seen in the longitudinal direction X, upon an adjustment of the first linkage assembly in the transverse direction Y and/or in the vertical direction Z. As an example, the second linkage assembly 36 here comprises the movable linkage member 38 and the guiding member 37 connected to the housing. In other words, the first air flow arrangement is here connected to the housing via the guiding member 37. The linkage member 38 is adapted at a first end to cooperate with the guiding member 37 and at a second end to cooperate with the shutoff mechanism so that a movement of the first module of the first air flow adjustment arrangement 22 is transferred into a movement of the linkage member along the longitudinal direction X to effect a regulation of the air flow by the shutoff mechanism 40 independently of the position of the second air flow arrangement 24. As an example, the linkage member 38 is adapted at a first end to cooperate with the guiding member 37 by being operatively connected to each other via the connecting pin 20a of the arrangement 22. Thus, the linkage member 38 here includes an opening 38a for receiving the connecting pin 20a. Similarly, the guiding member 37 includes an opening 37a for receiving the connecting pin 20a. The length of the connecting pin 20a, as seen in the transverse direction Y should thus be at least sufficient to accommodate the guiding member 37 and the linkage member 37. However, the linkage member 38 can be adapted at a first end to cooperate with the guiding member 37 in other ways, e.g. by a separate connecting member or the like forming a functional connection between the member 38 and the member 37 so that the second linkage assembly moves upon a movement of the user-actuated manual mechanism 32 along the longitudinal direction X.

As further described herein, the linkage member 38 of the second assembly 36 can be adapted at the second end to cooperate with the shutoff mechanism 40 by means of a plurality of serrations 97a configured to cooperate with a plurality of serrations of the shutoff mechanism 40.

Typically, although not strictly required, the guiding member 37 is configured to allow for a displacement of the first module along the transverse direction Y. As an example, this is provided by having a guiding recess 17 in the guiding member 37 configured to cooperate with a sliding surface 19 of the housing 11, as illustrated in e.g. 1a, 1d and 2a. Further, the width of the guiding recess in the transverse direction Y is bigger than the width of the sliding surface 19 as seen in the transverse direction Y.

As is shown in FIGS. 2a and 2b, the connecting pin 20a of the arrangement 22 is configured to operatively connect the linkage member 38, the guiding member 37 to the housing.

It is to be noted that the device may also comprise a third linkage assembly 33, which typically is provided with the same features and functions as the second linkage assembly except that the third linkage assembly is arranged on another side of the first module. In this context, it should be readily appreciated that all features, functions and effects of the second linkage assembly may likewise be incorporated in the third linkage assembly. The third linkage assembly will also be further described below.

Similar to the configuration of the first linkage member, the second linkage assembly 36 is movably arranged in the housing 11. Analogously, the third linkage assembly is movably arranged in the housing. Further, due to configuration of the second linkage assembly, as described above, the second linkage assembly will remain in position upon a movement of the vertical air flow adjustment arrangement 22 in the vertical direction Z and/or a movement of first linkage assembly 34 (and the horizontal air flow adjustment arrangement 24) in the transverse direction Y. Thus, the first linkage assembly 34 and also the user-actuated manual mechanism 32 are allowed to move in the transverse direction Y and in the vertical direction Z independently of the position of the shutoff mechanism 40 and the second linkage assembly 36, while a movement of the user-actuated manual mechanism 32 in the longitudinal direction X is translated into a movement of the second linkage assembly 36 in the longitudinal direction X to effect a regulation of the air flow by the shutoff mechanism 40 independently of the position of the air flow arrangement 22 and the first linkage assembly 34. This function is likewise applicable to the third linkage assembly 33 relative to the first linkage assembly 34.

As the second linkage assembly 36 is here operatively connected to the user-actuated manual mechanism 32 via the first module 20, which is arranged movable relative to the second module 21, of the first air flow adjustment arrangement 22 and configured to effect a regulation of the air flow by the shutoff mechanism 40 by a movement of the user-actuated manual mechanism 32 along the longitudinal direction, the regulation of the air flow by the shutoff mechanism 40 can be performed independently of the position of the horizontal air flow arrangement 24 and independently of the position of the vertical air flow adjustment arrangement 22 as seen in the vertical Z and the transverse direction Y. In other words, due to configuration of the second linkage assembly and also the configuration of the first linkage assembly, which allows the guiding member 25 of the horizontal air flow adjustment arrangement 22 to freely move in the longitudinal direction X of the recess 35 of the first linkage assembly 34, only the regulation of the air flow by the shutoff mechanism is effected by a movement of the second linkage assembly, the user-actuated manual mechanism and the first module along the longitudinal direction X. It this context, it is to be noted that a movement of the first module 20 of the vertical air flow adjustment arrangement 22 in the longitudinal direction X is translated into a movement of the second linkage assembly 36 to effect a regulation of the air flow by the shutoff mechanism 40. A movement of these components along the longitudinal direction X can thus be performed independently of the position of the (second) horizontal air flow adjustment arrangement 24 and the first linkage assembly 34.

In addition, the position of the shutoff mechanism 40 is unaffected by an adjustment of the second (horizontal) air flow adjustment arrangement 24. Also, the position of the shutoff mechanism 40 is unaffected by an adjustment of the first (vertical) air flow adjustment arrangement in the vertical direction Z. That is, by an adjustment of the first linkage assembly along the transverse direction Y and/or by an adjustment of the user-actuated manual mechanism about the transverse axis $A_T$. In other words, the shutoff mechanism 40 is maintained in its position upon a movement of the first linkage assembly 34 in the vertical direction Z, since the connecting pin 20a of the first module 22 is arranged to freely rotate about the transverse axis $A_T$ and within the second linkage assembly openings 37a and 38a.

As mentioned above, the first air flow arrangement comprises the interconnecting member 28 which is provided with the recess 39a.

As the user-actuated manual mechanism 32 is slidably engaged to the first module of the vertical (first) air flow adjustment arrangement 22, it becomes possible only to move the first linkage assembly 34 along the transverse direction Y (by moving the user-actuated manual mechanism 32 in the transverse direction) without adjusting the position of the shutoff mechanism 40. Accordingly, the configuration of the first linkage assembly 34 and the second linkage assembly 36 enables that the first linkage assembly 34 is freely movable along the transverse direction Y in relation to the second linkage assembly 36. Hence, the shutoff mechanism 40 and the second linkage assembly 36 are maintained in position upon a movement of the first linkage assembly 34 in the transverse direction Y.

Accordingly, the second linkage assembly 36 is configured to adjust the position of the shutoff mechanism 40 upon a movement of the second linkage assembly 36 in the longitudinal direction X. The second linkage assembly 36 is also configured to remain in position upon a movement of the first linkage assembly 34 in the transverse direction Y and/or in the vertical direction Z.

Moreover, in this example embodiment, as is shown in FIGS. 1a and 1d, the user-actuated manual mechanism 32 is configured to permit manual operation of the air flow adjustment arrangements 22 and 24 and the shutoff mechanism 40 from the outside of the device. Typically, the user-actuated manual mechanism 32 is arranged downstream of the first (vertical) air flow adjustment arrangement 22. However, it is to be noted that the user-actuated actuated manual mechanism 32 may be partly located within the arrangement 22 when the first module 20 is moved relative the second module 21 in the direction X.

In this context, the outside of the device here refers to the outside of the second side 62, as seen in the longitudinal direction X.

As mentioned above, downstream here refers to a position along the horizontal direction x (longitudinal direction) of the device. Typically, the air flow adjustment arrangements 22 and 24 are arranged downstream of the shutoff mechanism 40.

In the example embodiment, the second linkage assembly 36 is movably arranged in the device along the longitudinal direction X such that a movement of the shutoff mechanism 40 is effected by a movement of the user-actuated manual mechanism 32 in the longitudinal direction X, an adjustment of the vertical air flow adjustment arrangement 22 is effected by a movement of the user-actuated manual mechanism 32 in the vertical direction Z and an adjustment of the horizontal air flow adjustment arrangement 24 is effected by a movement of the user-actuated manual mechanism 32 in the transverse direction Y. To this end, a horizontal adjustment of the air flow via adjustment of the horizontal air flow adjustment arrangement 24 is effected by a movement of the user-actuated manual mechanism 32 in the transverse direction Y. Thus, a vertical adjustment of the air flow via the vertical air flow adjustment arrangement 22 is effected by a movement of the user-actuated manual mechanism 32 in the vertical direction Z. In addition, as described herein, any one of the vertical air flow adjustment arrangement 22 and the horizontal air flow adjustment arrangement 24 and the shutoff mechanism 40 can be independently operated within the device. Hence, the device provides a multi-functional solution which is both compact and robust while allowing for an integrated push/pull function via the user-actuated manual mechanism 32 being operable from the outside of the device as seen in the longitudinal direction X, which is shown in e.g. FIGS. 1a to 1d.

As mentioned above, the user-actuated manual mechanism 32 may be slidably engaged to the first (vertical) air flow arrangement 22 and configured to be movable along the longitudinal direction X and the transverse direction Y upon operation of a user. In this example embodiment, as described in relation to FIGS. 1a-1d, the user-actuated manual mechanism 32 is slidably engaged to the first module 20 of the vertical air flow adjustment arrangement 22 and movable along the longitudinal direction X and the transverse direction Y upon operation of a user. As an example, the user-actuated manual mechanism 32 can be slidably arranged on a flange 92 of the first module of the vertical air flow adjustment arrangement 22. A slidably arrangement between two components can be provided in several different ways, e.g. by means of two frictional surfaces. In this example embodiment, the user-actuated manual mechanism 32 includes a recess for slidably engaged with a surface of a flange of the first module of the vertical air flow adjustment arrangement 22. However, this type of arrangement is well-known in the art, and is therefore not further described herein. Typically, although not strictly required the user-actuated manual mechanism 32 is assembled with the first linkage assembly 34 to form a closed configuration about the flange of the first module 20, as illustrated in e.g. FIG. 2a in conjunction with FIG. 2c or 2d.

Typically, the user-actuated manual mechanism 32 is slidably engaged to the vertical air flow adjustment arrangement 22 and configured to permit operation of the user-actuated manual mechanism 32 along the longitudinal direction X and the transverse direction Y, upon operation of a user, independently of the position of the vertical air flow adjustment arrangement 22, while an adjustment of the vertical air adjustment mechanism 22 is effected by a movement of the manual mechanism 32 in the vertical direction Z. In this example embodiment, a movement of the user-actuated manual mechanism 32 in the vertical direction Z corresponds to an inclination of the mechanism 32 about a transverse axis $A_T$, as shown in e.g. FIG. 2b. Thus, the user-actuated manual mechanism 32 is typically operatively connected to the first linkage assembly 32 to permit a pivoting of the user-actuated manual mechanism 32 about the transverse axis $A_T$.

In this example embodiment, the first linkage assembly 34 is here located essentially in a central region in the device, as seen in the directions X, Y, and Z.

In a configuration as shown in the Figures, e.g. in FIGS. 1a to 1d, in which the vertical air flow adjustment arrangement 22 includes the first module 20 and the second module 21, the vertical air flow adjustment arrangement 22 is independently pivotably connected to the housing 11 via at least one pivoting connection 68a and 68b. The pivoting connection is configured to permit the vertical air flow adjustment arrangement 22 to pivot about a transverse pivot axis $A_{TP}$. Typically, the pivoting connection includes a set of pivoting points at opposite vertical sides of the arrangement 22, as shown in FIGS. 1a to 1d. Although strictly not necessary, the vertical air flow adjustment arrangement 22 is here independently pivotably connected to the housing 11 via a plurality of pivoting connections 68a, 68b, 69a and 69b. As an example, the pivoting connections may include a set of two pivoting connections arranged spaced apart, a shown in e.g. FIGS. 1a to 1d. In addition, the pivoting points of the pivoting connections are arranged on opposite vertical sides of the mechanism 22. Typically, although not strictly necessary, each one of the first module 20 and the second module 21 is provided with a set of opposite arranged pivoting connections.

Referring again to FIGS. 1a to 1d, the vertical air flow adjustment arrangement 22 in this example embodiment comprises the first module 20 and the second module 21. The first module is configured to move relative the second module along the longitudinal direction X. Typically, as illustrated in FIGS. 1a to 1d and FIGS. 2a-2d, the second linkage assembly is thus operatively connected to the user-actuated manual mechanism via the first module 20 of the first air flow adjustment arrangement. The second linkage assembly is further configured to effect a regulation of the air flow by the shutoff mechanism by a movement of said user-actuated manual mechanism along the longitudinal direction.

In addition, the vertical air flow adjustment arrangement 22 in this example embodiment comprises a set of spaced apart air directing elements in the form of blades or flanges 92 pivotably arranged about the pivoting connections 68 and 69. The set of the spaced apart air directing elements (in the form of blades or flanges) 92 may be pivotably arranged about one single pivoting connection in the form of one module. Alternatively, as shown in FIGS. 1a to 1d, the set of spaced apart air directing elements, in the form of blades or flanges 92, can be arranged individually about a number of spaced apart pivoting connections 68 and 69. The first module is typically pivotally connected to the housing by the connecting pin 20a and 20b, respectively. The second module is typically pivotally connected to the housing by the pivoting connections 68a, 68b, 69a and 69b, respectively. The air directing elements 92 may in general each have a rectangular cross-section and a length extending in the transverse direction y. To this end, the air directing elements 92 are configured to direct the air flow in the vertical direction Z.

Typically, each flange of the set of flanges 92 is configured to be adjusted between a plurality of positions by being rotationally arranged about a transverse axis, respectively. In this way, the vertical air flow adjustment arrangement 22 is adjusted between a plurality of positions, as seen in the vertical direction Z. Typically, the vertical air flow adjustment arrangement 22 is at least moveable between an outer first position 150 and an outer second (upper) position 160, as seen in the vertical direction Z. In an example, when the arrangement is adjusted along the vertical direction Z, the outer first position may refer to the lower position, while the outer second position may refer to the upper position.

Typically, although not strictly necessary, each one of the first module 20 and the second module 21 is provided with at least one flange configured to be adjusted between a plurality of positions.

Figure 4A:
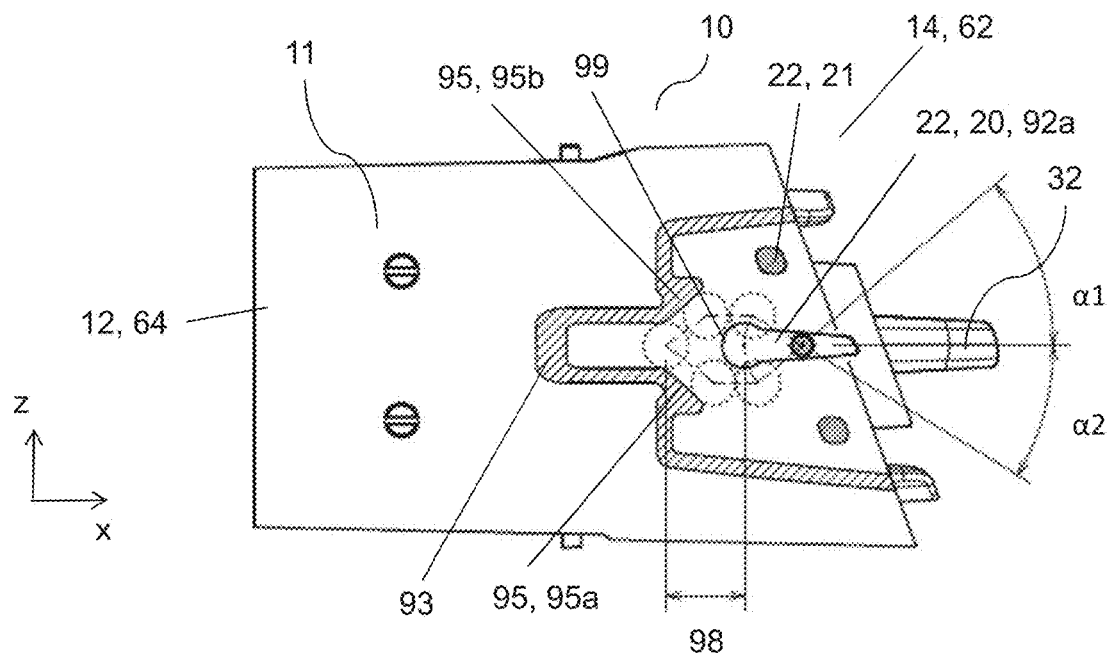
FIGS. 4a-4c schematically illustrate further parts of a first air flow adjustment arrangement of an air nozzle device according to an example embodiment of the present invention.
Figure 4B:
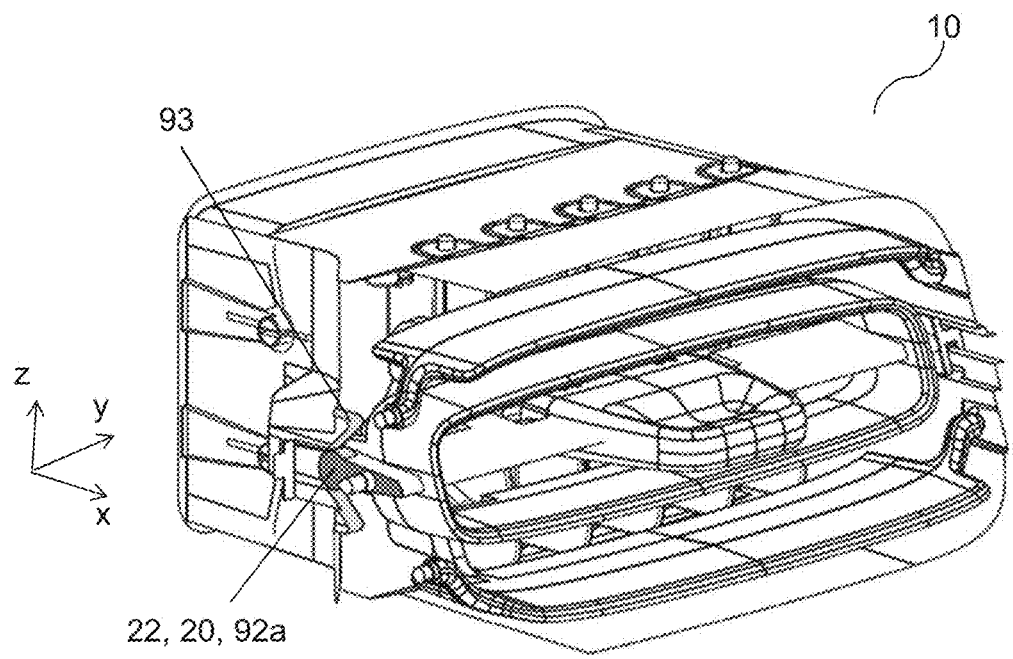
Figure 4C:
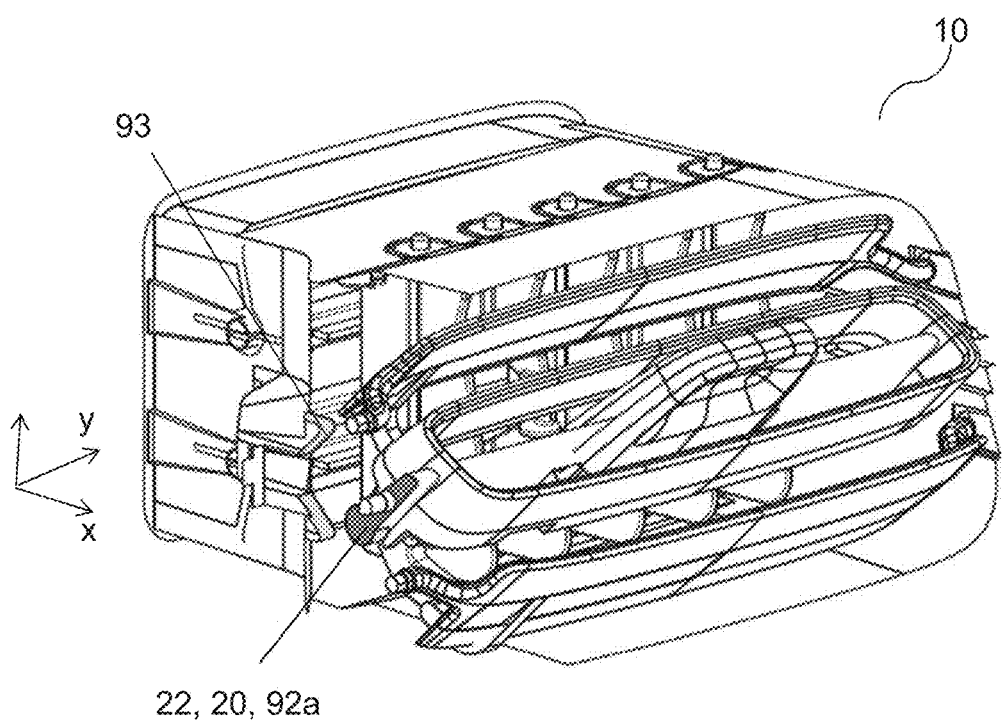

In one example embodiment, as shown in FIGS. 4a-4c, the device further comprises an alignment member 93, which is further described hereinafter.

As mentioned above, the shut off mechanism is configured to open and close the air flow, i.e. regulate the air flow, by means of the shut off mechanism 40. In addition, the first air flow adjustment arrangement in some design variants includes the first module and the second module, in which the first module is movably arranged relative to the second module in the longitudinal direction X. However, as both the first module and the second module are also adjustable in the vertical direction (or rotatably arranged about a transverse axis), it might sometimes occur that the first module accidently contact the second module when the first module is moved in relation to the second module in the longitudinal direction when the flange(s) of the first module is angled. This may occur when the first module is pushed into the housing, as seen in the longitudinal direction X. In order to further improve the functionality of the first air flow arrangement, the arrangement in one example embodiment further comprises an alignment member 93.

As shown in FIGS. 4a-4c, the alignment member 93 comprises a guiding surface 95 configured to engage with a corresponding guiding surface 99 on the first module 20. Thus, the first module here comprises a centre air directing elements 92a (centre flange) having a guiding surface 99. The air directing elements 92 are in this example horizontal flanges for directing and adjusting the air in the vertical direction Z, as shown in the FIGS. 4a-4c. FIG. 4a is a cross sectional view of the device illustrating the alignment member 93 and the first module 20, when the first air flow arrangement is in the nominal position and the shut off mechanism is in the open position. FIG. 4b is an isometric partial view of the device illustrating the alignment member 93 and the first module 20, when the first air flow arrangement is in the nominal position and the shut off mechanism is in the closed position. FIG. 4c is an isometric partial view of the device illustrating the alignment member 93 and the first module 20, when the first air flow arrangement is in an angled position and the shut off mechanism is in the open position. As mentioned above, the user-actuated manual mechanism 32 is configured to open/close the shutoff mechanism 40 via a movement of first module relative to the second module to effect a movement of the second linkage assembly along the longitudinal direction X.

As an example, the guiding surface 95 defines a conical-shaped surface for aligning the flange(s) of the first module in a horizontal alignment with the flange(s) of the second module. Typically, the guiding surface defines a conical-shaped surface for aligning the flanges of the first module into the nominal position 155, i.e. in parallel with a horizontal line of the device (as seen when the device is arranged in an essentially horizontal orientation).

In the example shown in FIGS. 4a-4c, the conical shape is formed by opposite arranged inclined surfaces 95a and 95b.

The operation of the first module and the alignment member can be further described by the following example in conjunction with FIGS. 4a-4c.

As shown in FIG. 4b, when the air flow is closed by setting the shut off mechanism in a closed state, the first module 20 of the air flow arrangement 22 is positioned in a location closer to the shut off mechanism, as seen in the longitudinal direction X, than when the shut off mechanism is in the open position, as shown in FIG. 4c. Typically, when the shut off mechanism is in the open state, the first module 20 is essentially flush with the second module 21, as seen in the vertical direction. In the open position of the shut off mechanism, air is allowed to flow through the air passage. In this position, vertical adjustment of the air flow is permitted by adjusting the air directing elements 92 of the first air flow arrangement 22. By way of an example, the air directing elements, illustrated by the centre air directing element 92a in FIG. 4a, may be adjusted with an angle α. The air directing element 92a is here adjusted about the transverse axis AT. As an example, the air directing element 92 can be varied upwardly from about 0-40 degrees. As an example, the air directing element 92 can be varied downwardly from about 0-30 degrees. However, other levels or ranges may be readily conceivable. As shown in FIG. 4a, α1 defines the upward angle adjustment of one air directing element 92, whilst α2 defines the downward angle adjustment of one air directing element.

By way of an example, the first module 20 is moved about 10 mm in the longitudinal direction towards the first side 64 of the air device. In this example, this corresponds to that the first module 20 is moved about 10 mm in the longitudinal direction towards the alignment member of the air device. Typically, the first air module is movable from a first position, in which the first module is essentially flush with the second module, and a second position, in which the first module is positioned closer to the shut off mechanism than the second module, as seen in the longitudinal direction X. As shown in FIG. 4a, the longitudinal distance between the first position and the second position of the first module is illustrated by the distance 98.

As mentioned above, the guiding surface 95 of the alignment member 93 has a geometry adapted to guide the centre air directing element 92*a* into a horizontal (i.e. nominal) position when the airflow is closed by the shut off mechanism. As an example, the guiding surface 95 of the alignment member 93 has a geometry adapted to guide the guiding surface 99 of the centre air directing element 92*a* into a horizontal position when the airflow is closed by the shut off mechanism, as shown in FIGS. 4*a* and 4*b*. Due to this configuration of the air flow arrangement and the alignment member of the device, it becomes possible to align the direction of the air directing elements of the first module with the direction of the air directing elements of the second module when the shut off mechanism is set into the closed state (by moving the first module towards the shut off mechanism, as seen in the longitudinal direction X).

As shown in FIG. 4*a*, the first module 20 can be aligned with the second module 21 essentially independently of the value of the angle α, which is illustrated by the circles in dashed lines representing several different positions of the centre air directing element 92*a* of the first module.

Typically, although not strictly required, the alignment member 93 is fixated in the housing 11 of the device.

Typically, if the guiding surface of the alignment member is a conical-shaped surface, as shown in FIGS. 4*a*-4*c*, the guiding surface of the centre air directing element is non-conical. As an example, the guiding surface of the centre air directing element is a circular-shaped surface, or at least a semi-circular shaped surface, as shown in the figures. However, other alternatives are conceivable as long as the guiding surfaces are capable of horizontally aligning the first module with the second module. That is, the guiding surfaces are adapted to horizontally aligning the air directing element(s) of the first module with the air directing element(s) of the second module.

It is to be noted that the configuration of the alignment member as described above may be installed and arranged in any one of the example embodiments of the device as described herein.

In one design variant, there is provided an air nozzle device for a vehicle comprising a housing defining an interior volume and having an air inlet 12 at one side, an air discharge opening 14 at a second side and an air flow channel 18 through the housing 11 for transporting a flow of air between the air inlet and the air discharge opening, the device 10 further comprising a first air flow adjustment arrangement 22 pivotably connected to said housing and configured to adjust the direction of the air flow, wherein said first air flow adjustment arrangement 22 comprises a first module 20 and a second module 21, said first module being configured to move relative said second module along the longitudinal direction X, and wherein the first air flow arrangement 22 further comprises an alignment member 93 having a guiding surface 95 adapted to engage with a corresponding guiding surface 99 of the first module of the air flow arrangement when said first module 20 is moved towards the alignment member (93), as seen in the in longitudinal direction X. The device according to this design variant may be combined with, installed and arranged in any one of the example embodiments of the device as described herein.

In a configuration as shown in the Figures, e.g. in FIGS. 1*a* to 1*d*, the horizontal air flow adjustment arrangement 24 is independently pivotably connected to the housing 11 via at least one pivoting connection 88*a* and 88*b*. The pivoting connection of the horizontal air flow adjustment arrangement 24 is configured to permit the horizontal air flow adjustment arrangement 24 to pivot about a vertical pivot axis. Typically, the pivoting connection of the horizontal air flow adjustment arrangement 24 includes a set of pivoting points at opposite horizontal sides of the arrangement 24, as shown in FIGS. 1*a* to 1*d*. Although strictly not necessary, the horizontal air flow adjustment arrangement 24 is here independently pivotably connected to the housing 11 via a plurality of pivoting connections 87*a* and 87*b*, 88*a*, 88*b*, 89*a* and 89*b*. As an example, the pivoting connections may include a set of three pivoting connections arranged spaced apart, as shown in e.g. FIGS. 1*a* to 1*d*. In addition, the pivoting points of the pivoting connections are arranged on opposite horizontal sides of the arrangement 24.

Referring again to FIGS. 1*a* to 1*d*, the horizontal air flow adjustment arrangement 24 in this example embodiment here comprises a set of spaced apart air directing elements in the form of blades or flanges 94 pivotably arranged about the pivoting connections 87, 88, and 89. The set of the spaced apart air directing elements (in the form of blades or flanges) 94 may be pivotably arranged about one single pivoting connection in the form of one module, or, as shown in FIGS. 1*a* to 1*d*, individually about the several spaced apart pivoting connections 87, 88 and 89. Furthermore, as shown in FIG. 1*d*, the set of the spaced apart air directing elements 94 is here connected by a bridging member 91 in order to move in a synchronized manner.

The air directing elements 94 may in general each have a rectangular cross-section and a length extending in the vertical direction z. To this end, the air directing elements 94 are configured to direct the air flow in the horizontal direction X.

Moreover, at least one of the air directing elements 94 is shaped to define the guiding member 25.

Typically, each flange of the set of flanges 94 is configured to be adjusted between a plurality of positions by being rotationally arranged about a transverse axis, respectively. In this way, the horizontal air flow adjustment arrangement 24 is adjusted between a plurality of positions, as seen in the transverse direction Y. Typically, the horizontal air flow adjustment arrangement 24 is at least moveable between an outer first transverse position 130 and an outer second transverse position 140, as seen in the transverse direction Y. In an example, when the arrangement 24 is adjusted along the transverse direction Y, the outer first transverse position may refer to the right position, while the outer second transverse position may refer to the left position.

As may be gleaned from FIGS. 1*a* to 1*d*, the guiding member 25 of the air flow adjustment arrangement is here arranged on the horizontal air flow adjustment arrangement 24. The guiding member may as an example be provided in the form of a thin member having a rectangular cross-section and a length in the vertical direction z, when seen in an assembled configuration of the device. The guiding member 25 can be an integral part of the horizontal air flow adjustment arrangement 24 as shown in FIGS. 1*a* and 1*d*. Alternatively, the member 25 can be provided in the form of a separate part connected to the horizontal air flow adjustment arrangement 24 in a vertical orientation. The cross-section of the member 25 may alternatively be circular. The guiding member 25 is configured to cooperate with the recess 35 of the first linkage assembly 32 so as to effect a movement of the horizontal air flow adjustment arrangement 24 by a movement of the first linkage assembly 32 in a transverse direction Y, while maintaining the position of the horizontal air flow adjustment arrangement 24 upon a movement of the first linkage assembly 32 along the longitudinal direction X. This is due to that the guiding member 25 is freely movable in the recess along the direction X.

Optionally, although strictly not required, the shutoff mechanism 40 may further be connected to the housing 11. One example advantage with this configuration is that the shutoff mechanism 40 is arranged to the housing in a more secure and stable manner.

The shutoff mechanism 40 is in this example embodiment configured to move between an open position defining a passage for the air flow in the air flow channel and a closed position defining an essentially air tight configuration against (with) the inner surfaces of the housing 11, as shown in the FIGS. 2c-2d and 3a-3j. However, it should be readily appreciated that the shutoff mechanism can be varied and moved to a position between the open position and the closed position. Thus, the shutoff mechanism can be moved and maintained in a position between the open position and the closed position. As an example, the shutoff mechanism can be moved so that the air flow passage is essentially 50% open etc.

As an example, and as shown in FIGS. 1a to 1d and FIGS. 2c-2d, the shutoff mechanism 40 thus typically, although not strictly necessary, comprises a pair of blades being moveable between the open position in which the set of blades forms a passage for the air flow in the air flow channel and the closed position in which the set of blades are adapted to form an essentially air tight configuration against the inner surfaces of the housing.

Figure 2C:
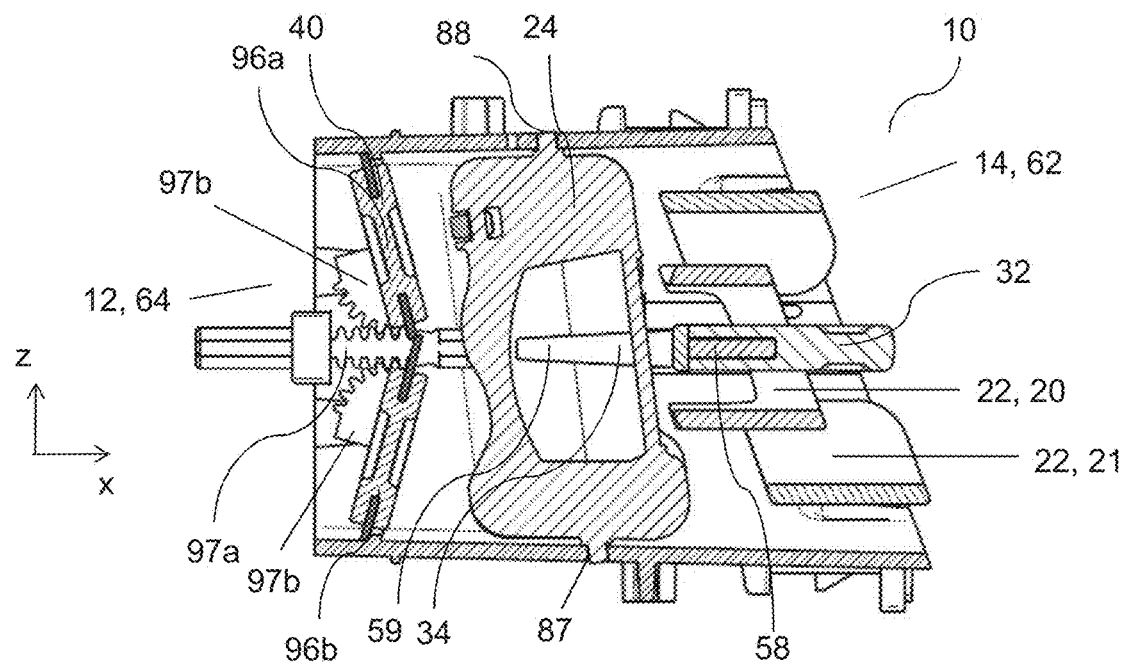
FIGS. 2c and 2d are cross-sectional views of an example embodiment of the air nozzle device, in which two operational modes of the shutoff mechanism are illustrated.
Figure 2D:
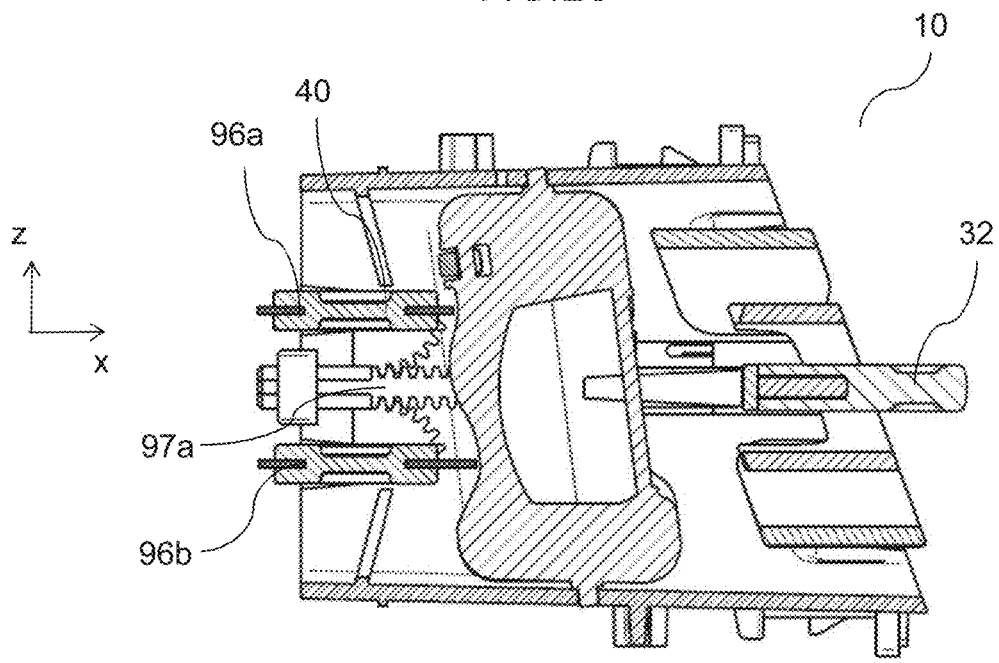

Thereby, the user-actuated manual mechanism 32 is capable of open/close the shutoff mechanism 40 via a movement of the second linkage assembly 36 and the first module 20 of the first air flow adjustment arrangement along the longitudinal direction X, as illustrated in e.g. FIGS. 2c-2d.

In addition, the user-actuated manual mechanism 32 is capable of independently adjusting the direction of the air flow via the air flow adjustment arrangements 22, 24 while maintaining the position of the shutoff mechanism 40 by a movement of the first linkage assembly 34 along the transverse direction Y. In the example embodiment as illustrated in FIGS. 1a to 1d, FIG. 2a-2d and FIGS. 3a to 3j, the user-actuated manual mechanism 32 is capable of independently adjusting the horizontal direction of the air flow via the horizontal air flow adjustment arrangement by a movement of the first linkage assembly 34 along the transverse direction Y and independently adjusting the vertical direction of the air flow via the vertical air flow adjustment arrangement 22 by a movement of the first linkage assembly 34 along the vertical direction Y, while maintaining the position of the shutoff mechanism 40.

It should be readily appreciated that a movement of the first linkage assembly 34 along the vertical direction Y typically refers to that the user-actuated manual mechanism 32 is manipulated about its transverse axis $A_T$, as shown in FIG. 2d.

Further, as is readily appreciated from the explanations above in conjunction with the FIGS. 3a through 3j, as described hereinafter, there is disclosed an example embodiment of an air nozzle device, in which the user-actuated manual mechanism 32 is capable of independently adjusting the vertical air flow adjustment arrangement 22 by a movement of the first linkage assembly 32 along the vertical direction Z, independently adjusting the horizontal air flow adjustment arrangement 24 by a movement of the first linkage assembly 32 along the transverse direction Y, and independently regulating the air flow via the shutoff mechanism 40 by a movement of the second linkage assembly 36 along the longitudinal direction X.

FIGS. 2a-2d schematically illustrate more detailed views of the air nozzle device according to an example embodiment of the present invention. As mentioned above, the device comprises a user-actuated manual mechanism 32, a first linkage assembly 34 and a second linkage assembly 36. Typically, the user-actuated manual mechanism 32 is adapted to be manipulated by a user to move the second linkage assembly 36 along the longitudinal direction in order to regulate the air flow via the shutoff mechanism and/or redirect the air flow (via the horizontal and/or the vertical air flow adjustment arrangements) according to the user's wishes. As is shown in FIG. 1c, 1d or FIGS. 2a-2c, the first linkage assembly 34 is operatively connected to the user-actuated manual mechanism 32 at one end 58. The end 58 is here arranged downstream from a second 59 of the assembly 34, as seen in the longitudinal direction X. In addition, the first linkage assembly 34 has an extension in the direction X, the transverse direction Y and the vertical direction Z. Furthermore, the first linkage assembly 34 comprises the channel or groove 35 to accommodate a part of the guiding member 25 of the horizontal air flow adjustment arrangement 24 (as shown in e.g. FIG. 1b). The channel or groove 35 extends at least partly in the longitudinal direction X to permit a movement of the first linkage assembly 34 along the longitudinal direction X, as mentioned above.

Referring now to FIGS. 1a to 1d, in particular FIG. 1b, in conjunction to FIG. 2c-2d, the first linkage assembly 34 is configured to be freely movable along the vertical direction Z of the first linkage member, thereby freely movable in the vertical direction Z of the device 10, at least along the length of the guiding member 25 in the vertical direction Z. In this manner, the first linkage assembly 34 can be moved in the vertical direction Z without moving the horizontal air flow adjustment arrangement 24, at least between a movement corresponding to the length of the guiding member 25 in the vertical direction.

Since the guiding member 25 is configured to also move freely along the longitudinal direction X due to the shape of the recess, as seen in the longitudinal direction X, it becomes possible only to move the first linkage assembly 34 along the longitudinal direction X, at least a distance corresponding to the length of the recess in the longitudinal direction X, without adjusting the position of the horizontal air flow adjustment arrangement 24. Accordingly, the configuration of the first linkage assembly 34 and the guiding member 25 enables that the horizontal air flow adjustment arrangement 24 is only adjusted based on a movement of the first linkage assembly 34 along the transverse direction Y, while the shutoff mechanism 40 and the second linkage assembly 36 can be maintained in position upon a movement of the first linkage assembly 34 in the transverse direction Y due to the configuration of the second linkage assembly 36 as described herein.

Typically, as shown in FIG. 2a, the first linkage assembly includes two members 81, 82, which are arranged in a fork-like configuration. Thus, the guiding member 25 is oriented essentially in the vertical direction and arranged to freely move in-between the two members 81, 82. However, it is to be noted that other arrangements of the guiding member 25 and the first linkage assembly 34 are possible as long as the function of the first linkage assembly and the second linkage assembly is not compromised. The two members 81, 82 can either be integral parts of the first linkage assembly or separate parts connected to the first linkage member.

Turning now to the second linkage assembly 36, which is illustrated in e.g. FIG. 2a, the second linkage assembly 34 is operatively connected to the user-actuated manual mechanism 32 via the first module 20 of the first air flow adjustment arrangement 22. Further the second linkage assembly 36 is configured to effect a regulation of the air flow by the shutoff mechanism 40 by a movement of the user-actuated manual mechanism 32 along the longitudinal direction X.

Similar to the configuration of the first linkage member, the second linkage assembly 36 is movably arranged to permit a movement of the second linkage assembly 36, along the longitudinal direction X independently of the position of the first air flow adjustment arrangement 22. In this context, a movement of the user-actuated manual mechanism 32 in the longitudinal direction X is translated into a movement of the second linkage assembly 36 in the direction X to effect a regulation of the air flow by the shutoff mechanism 40 independently of the position of the air flow arrangement 22. Thus, the user-actuated manual mechanism 32 is configured to permit manual operation of the shutoff mechanism 40 from the outside of the device 10.

In addition, due to the configuration of the second linkage assembly 34 and its connection to the first module 20 of the first air flow adjustment arrangement 22, the position of the shutoff mechanism 40 is unaffected by a vertical adjustment of the vertical air flow adjustment arrangement 22 and the horizontal air flow adjustment arrangement 24, i.e. by an adjustment of the user-actuated manual mechanism 32 about a transverse axis and/or by an adjustment of the first linkage assembly along the transverse direction Y.

In other words, due to the configuration of the first linkage assembly 34 and the configuration of the second linkage assembly 36, the position of the shutoff mechanism 40 is unaffected by an adjustment of the vertical air flow adjustment arrangement 22 upon a movement of the user-actuated manual mechanism 32 in the vertical direction Z, e.g. by pivoting the user-actuated manual mechanism 32 about a transverse axis $A_T$. Analogously, the position of the horizontal air flow adjustment arrangement 24 is unaffected by an adjustment of the vertical air flow adjustment arrangement 22 upon a movement of the user-actuated manual mechanism 32 in the vertical direction Z, e.g. by pivoting the user-actuated manual mechanism 32 about the transverse axis $A_T$.

As the user-actuated manual mechanism 32 is here slidably engaged to the first air flow adjustment arrangement 22, as well as operatively connected to the first linkage assembly 34, and configured to be movable along the longitudinal direction X and the transverse direction Y upon operation of a user, it becomes possible to move the first linkage assembly 34 along the transverse direction Y without adjusting the position of the shutoff mechanism 40. Accordingly, the configuration of the first linkage assembly 34 and the second linkage assembly 36 enables that the first linkage assembly 34 is freely movable along the transverse direction Y in relation to the second linkage assembly 36. Hence, the shutoff mechanism 40 and the second linkage assembly 36 are maintained in position upon a movement of the first linkage assembly 34 in the transverse direction Y. One example of a configuration of the second linkage assembly 36 is illustrated in FIGS. 2a and 2b. It is to be noted that the second linkage assembly is typically configured to adjust the position of the shutoff mechanism upon the movement of the second linkage assembly 36 in the longitudinal direction X, and further configured to remain in position, as seen in the longitudinal direction X, upon an adjustment of the first linkage assembly in the transverse direction Y and/or in the vertical direction Z. As an example, the second linkage assembly 36 here comprises the movable linkage member 38 and the guiding member 37 connected to the housing. The linkage member 38 is adapted at a first end to cooperate with the guiding member 37 and at a second end to cooperate with the shutoff mechanism so that a movement of the first module of the first air flow adjustment arrangement 22 is transferred into a movement of the linkage member 38 along the longitudinal direction X to effect a regulation of the air flow by the shutoff mechanism 40 independently of the position of the second air flow arrangement 24. Typically, although not strictly required, the guiding member 37 is configured to allow for a displacement of the first module along the transverse direction Y. The first air flow adjustment arrangement 22 here further comprises an interconnecting member 28 for connecting the first module 20 and the second module 21 of the first air flow adjustment arrangement 22.

As shown in FIGS. 1a through 1d, and in FIGS. 2a-2b, the first linkage assembly 34 is essentially oriented in a central region of the device 10, as seen in the. Thus the operating member 30 is essentially oriented in the central region of the device 10, as seen in the longitudinal direction X, the transverse direction Y and the vertical direction Z.

As mentioned above, the second linkage assembly 34 is operatively connected to the user-actuated manual mechanism 32. As an example, the second linkage assembly 34 is here operatively connected to the user-actuated manual mechanism 32 via the first module of the first air flow adjustment arrangement 22. As illustrated in FIG. 2b, the second linkage assembly 36 is connected to an outer side area 78a of the first module of the first air flow adjustment arrangement 22. In the example embodiment illustrated in the Figures, e.g. FIG. 2b, the second linkage assembly 36 is configured to operatively connect to a connecting pin 20a projecting from the first module 20 of the arrangement 22. In this manner, the second linkage assembly 36 is capable of moving along the longitudinal direction X by means of cooperation between the connecting pin 20a and an opening of the second linkage assembly. It is to be noted that the second linkage assembly 36 may be connected to other parts of the first air flow adjustment arrangement 22 as long as the second linkage assembly 36 is operatively connected to the user-actuated manual mechanism 32. However, the second linkage assembly 36 is typically connected to the first module 20 of the first air flow adjustment arrangement 22.

When the device comprises a third linkage assembly 33, as mentioned above, the configuration of the third linkage assembly 33 comprises similar components and functions as previously described with respect to the configuration of the second linkage assembly 35. The third linkage assembly is typically connected to an outer side area 78b of the first module of the first air flow adjustment arrangement 22. In the example embodiment illustrated in the Figures, e.g. FIG. 2b, the third linkage assembly 33 is configured to operatively connect to a connecting pin 20b projecting from the first module 20 of the arrangement 22. In this manner, the third linkage assembly 33 is capable of moving along the longitudinal direction X by means of cooperation between a connecting pin 20b and a third linkage assembly opening. It is to be noted that the third linkage assembly 33 may be connected to other parts of the first air flow adjustment arrangement 22 as long as the third linkage assembly is operatively connected to the user-actuated manual mechanism 32. However, the third linkage assembly 33 is typically connected to the first module 20 of the first air flow adjustment arrangement 22.

Accordingly, the second linkage assembly and the third linkage assembly are arranged on opposite sides of the first module of the arrangement 22. As an example, the second linkage assembly is arranged adjacent an inner surface of the housing. Analogously, the third linkage assembly is arranged adjacent an inner surface of the housing. Thus, the first linkage assembly, the second linkage assembly and the third linkage assembly are arranged at different locations within the housing of the device.

Furthermore, the first linkage assembly is arranged on the first module 20 of the first air flow adjustment arrangement 22 spaced apart from the second linkage assembly as seen in the transverse direction Y. Analogously, the first linkage assembly is arranged on the first module 20 of the first air flow adjustment arrangement 22 spaced apart from the third linkage assembly as seen in the transverse direction Y.

Typically, although not strictly required, the second linkage assembly 36 is operatively connected to the shutoff mechanism 40 via a gearwheel connection for effecting a rotational movement of the set of blades 96a and 96b upon a movement of the second linkage assembly 36 along the longitudinal direction X. One example embodiment of a shutoff mechanism 40 provided with this type of gearwheel arrangement 97 is shown in FIG. 1a and further in FIGS. 2a-2d. As is illustrated, the second linkage assembly 36 is here provided with serrations 97a (or teeth) configured to cooperate with a gearwheel 97b on the shutoff mechanism. Thereby, the shutoff mechanism is adjusted in position upon a movement of the second linkage assembly 36 via a translation of motion between the serrations 97a of the second linkage assembly and the gearwheel 97b. This type of gearwheel connection is well-known in the art, and therefore not further described herein.

The shutoff mechanism may further comprise at least one shutoff mechanism pivoting connection 41a for pivotably connecting the shutoff mechanism to the housing. As illustrated in e.g. FIG. 1a, the shutoff mechanism here comprises a plurality of pivoting connection 41a-41d for pivotably connecting the shutoff mechanism to the housing.

The second linkage assembly 36 here also comprises the guiding member 37 for connecting the second linkage assembly 36 to the housing 11 to provide a fixation to the housing 11.

As shown in FIG. 2a, the second linkage assembly 36 here comprises an essentially elongated shaped member in the form of a movable linkage member 38. The linkage member 38 has a horizontal section essentially extending in the longitudinal direction X.

From the above description, it is to be noted that the user-actuated manual mechanism 32 is configured to move in the longitudinal direction X upon manipulation along the longitudinal direction X. As an example, this configuration is provided by having the first module 20 movably arranged relative to the second module 21. In addition, the first linkage assembly 34 is configured to move in the transverse direction Y independently of the second linkage assembly 36 upon manipulation of the user-actuated manual mechanism 32 along the transverse direction Y. As an example, this configuration is provided by having the user-actuated manual mechanism 32 slidably engaged to the first module of the first air flow adjustment arrangement and configured to be movable along the transverse direction Y upon operation of a user. Furthermore, the user-actuated manual mechanism 32 is configured to operate the first air flow adjustment arrangement 22 in the vertical direction Z independently of the first linkage assembly 34 and second linkage assembly 36 upon manipulation of the user-actuated manual mechanism 32 along the vertical direction Z, i.e. about the transverse axis $A_T$ (see e.g. FIG. 2b). As an example, this configuration is provided by the recess 25 and the channel or groove 35 relating to the first linkage assembly and the cooperation between the connecting pin 20a and the second linkage assembly openings 37a and 38a relating to the second linkage assembly. In this context, it is to be noted that the connecting pin 20a is arranged to freely rotate about the transverse axis $A_T$ and within the second linkage assembly openings 37a and 38a.

As such, the user-actuated manual mechanism 32 is capable of independently controlling any one of the shutoff mechanism 40, the vertical air flow adjustment arrangement 22 and the horizontal air flow adjustment arrangement 24 to set the air nozzle device in a desired configuration so as to allow a user to regulate and direct the air flow depending on the user's wishes.

To this end, the user-actuated manual mechanism 32 (via the second linkage assembly) is typically capable of positioning the shutoff mechanism 40 in two positions, i.e. the open position and the closed position. When the shutoff mechanism 40 is in an open position, the set of blades 96a and 96b are arranged parallel to the longitudinal direction X. Accordingly, when the shutoff mechanism 40 is in the closed position, the set of blades 96a and 96b are arranged perpendicular to the longitudinal direction X.

Thus, the shutoff mechanism is provided in the form of a push-pull mechanism 40. Typically, although not strictly required, the push-pull mechanism or function is provided by the shutoff mechanism together with the second linkage assembly 36.

As mentioned above, the user-actuated manual mechanism 32 is capable of independently controlling any one of the shutoff mechanism 40, the vertical air flow adjustment arrangement 22 and the horizontal air flow adjustment arrangement 24 to set the air nozzle device in a desired configuration so as to allow a user to regulate and direct the air flow depending on the user's wishes. In order to facilitate the understanding of the principle behind the example embodiments of the invention, a set of positions of the device will now be described with reference to FIGS. 3a-3j. In these figures, the example embodiment as described in relation to FIGS. 1a through 1b and 2a-2d is shown in a configuration when the first air flow adjustment arrangement is the vertical air flow adjustment arrangement 22 and the second air flow adjustment arrangement is the horizontal air flow adjustment arrangement 24. Throughout the description of the FIGS. 3a-3j, each figure illustrates an operational state of the air nozzle device, in which the positions of the shutoff mechanism, the vertical air flow adjustment arrangement and the horizontal air flow adjustment arrangement are shown in relation to each other. The positions of the mechanisms and the arrangements are varied based on the movements of the user-actuated manual mechanism and the first and second linkage assemblies, as mentioned above.

Figure 3A:
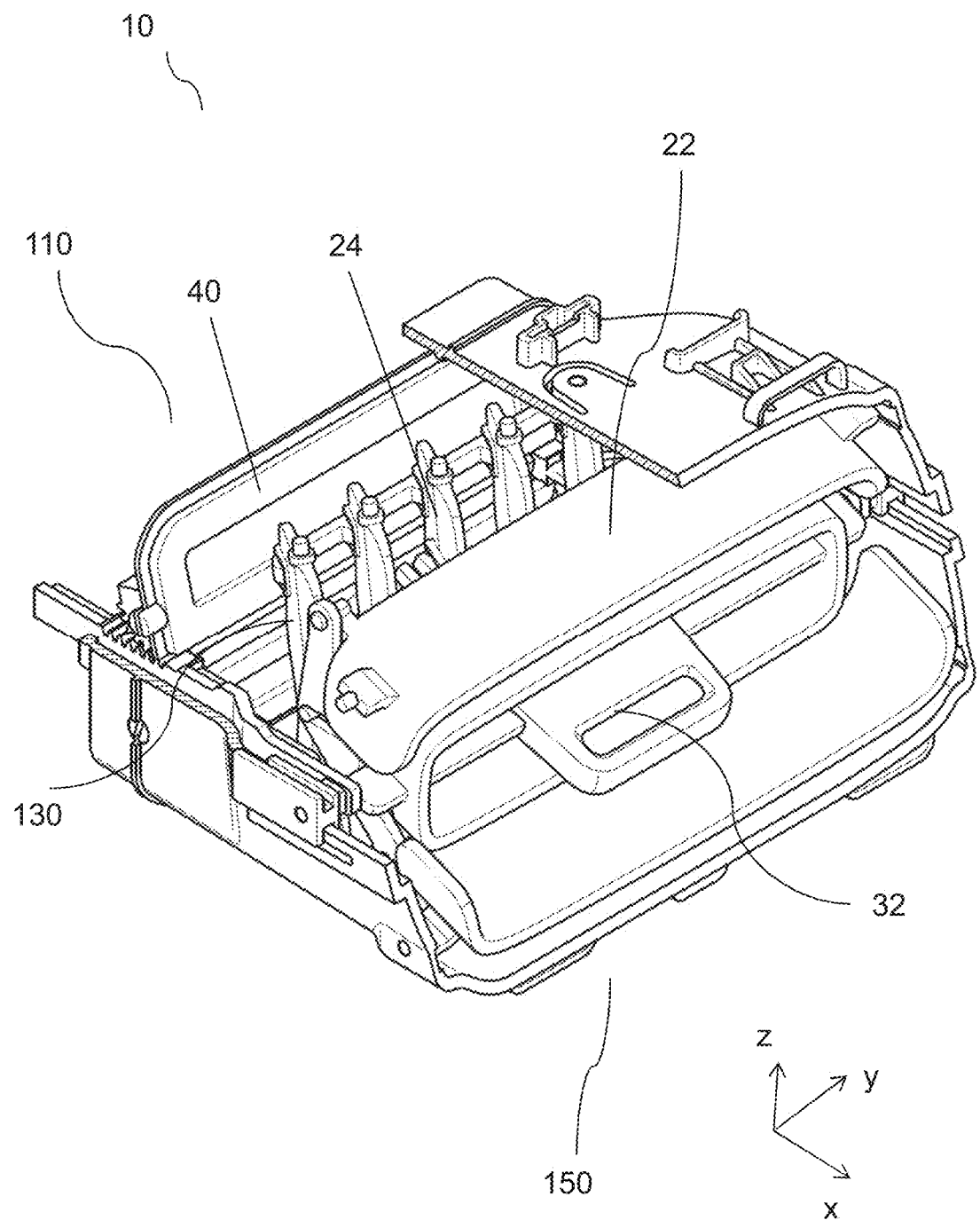
FIG. 3a illustrates the first example embodiment of the air nozzle device in an operational state, in which a shutoff mechanism for regulating the air flow is in a closed position, a vertical air flow adjustment arrangement for adjusting the air flow in the vertical direction Z is in an outer first (lower) position and a horizontal air flow adjustment arrangement for adjusting the air flow in the horizontal direction X is in an outer first transverse (right) position.

FIG. 3a illustrates an exemplary embodiment of the air nozzle device in an operational state, in which the shutoff mechanism 40 for regulating the air flow is in the closed position 110, as defined above. In addition, the vertical air flow adjustment arrangement 22 for adjusting the air flow in the vertical direction Z is here in the outer first (lower) position 150 and the horizontal air flow adjustment arrangement 24 for adjusting the air flow in the horizontal direction X is in the outer first transverse (right) position 130.

The user-actuated manual mechanism 32 is here pushed against the vertical air flow adjustment arrangement 22 as seen in the longitudinal direction X so that the shutoff mechanism 40 is set in the closed position, i.e. the set of flanges 96a and 96b forms an air-tight configuration with the inner surface of the housing (although not shown in FIG. 3a). By pushing the user-actuated manual mechanism 32 against the vertical air flow adjustment arrangement 22 as seen in the longitudinal direction X, the first module 20 is moved along the longitudinal direction X (due to being movably arranged relative the second module 21). Hereby, the second linkage assembly 36 is moved in the longitudinal direction X as an effect of the movement of the first module 20 along the longitudinal direction X, which results in that the second linkage assembly 36 sets the shutoff mechanism 40 in its closed position (see also FIGS. 2c-2d).

Figure 3B:
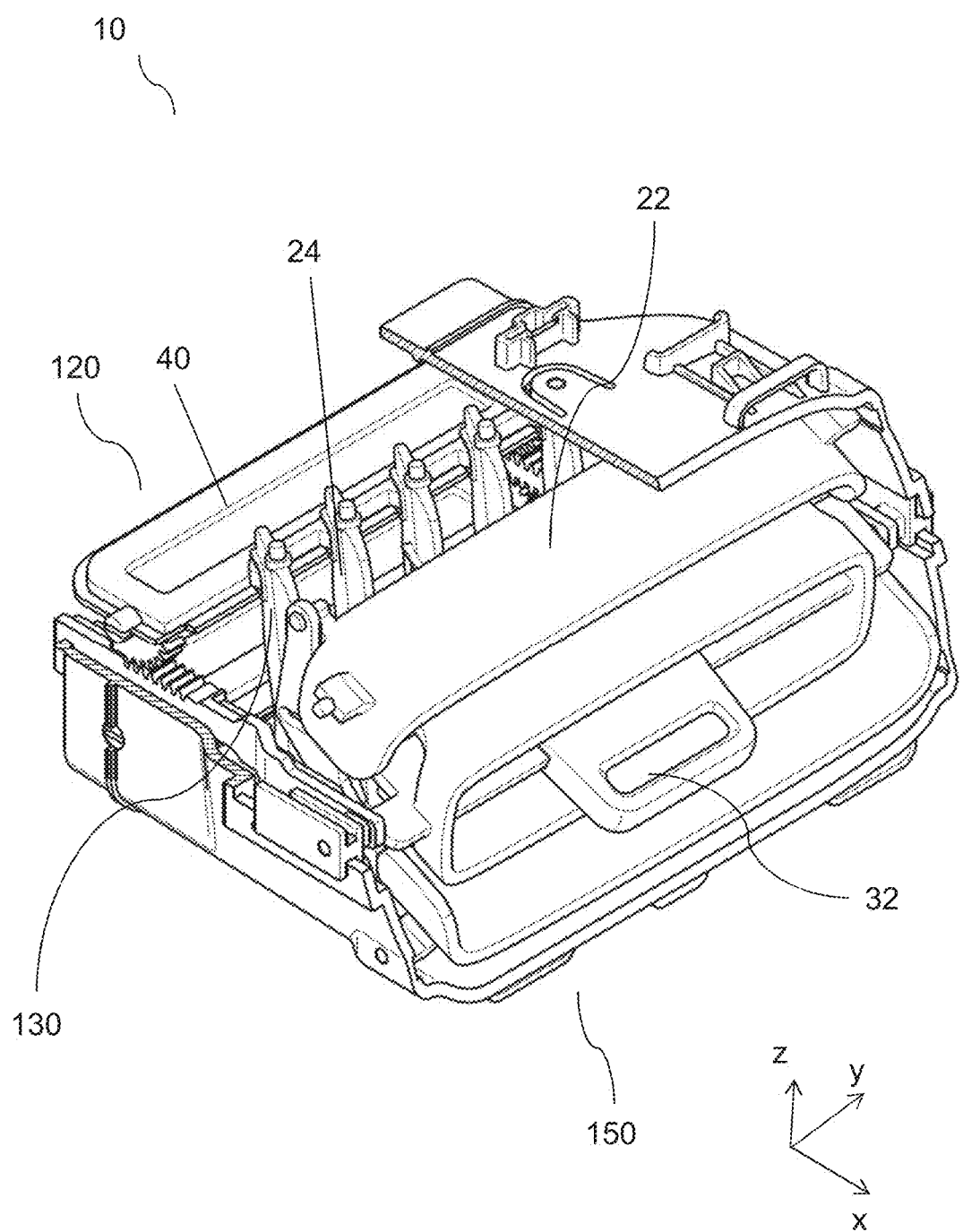
FIG. 3b illustrates the first example embodiment of the air nozzle device in an operational state, in which the shutoff mechanism for regulating the air flow is in an open position, the vertical air flow adjustment arrangement for adjusting the air flow in the vertical direction Z is in the outer first (lower) position and the horizontal air flow adjustment arrangement for adjusting the air flow in the horizontal direction X is in the outer first transverse (right) position.

FIG. 3b illustrates the first example embodiment of the air nozzle device in an operational state, in which the shutoff mechanism 40 for regulating the air flow is in the open position 120, the vertical air flow adjustment arrangement 22 for adjusting the air flow in the vertical direction Z is in the outer first (lower) position 150 and the horizontal air flow adjustment arrangement 24 for adjusting the air flow in the horizontal direction X is in the outer first transverse (right) position 130.

In other words, the operational state as described in relation to FIG. 3a only differs from the operational state as described in relation to FIG. 3b in that the shutoff mechanism 40 is adjusted from the closed position, as shown in FIG. 3a, to the open position, as shown FIG. 3b, while the position of the arrangement 22 and the position of the arrangement 24 are maintained, i.e. the position of the arrangement 22 and the position of the arrangement 24 are unaffected by the regulation of the air flow (an adjustment of the shutoff mechanism 40). In other words, the user-actuated manual mechanism 32 has been moved along the longitudinal direction X from a first position to a second position along the longitudinal direction X. Accordingly, by the configurations of the shutoff mechanism 40, the arrangement 22, the arrangement 24 and the user-actuated manual mechanism 32 as described above in relation to FIGS. 1a-1d and FIG. 2a-2d, it becomes possible to regulate the air flow via the shutoff mechanism 40 independently of the position of the vertical air flow adjustment arrangement 22 and the horizontal air flow adjustment arrangement 24.

Figure 3C:
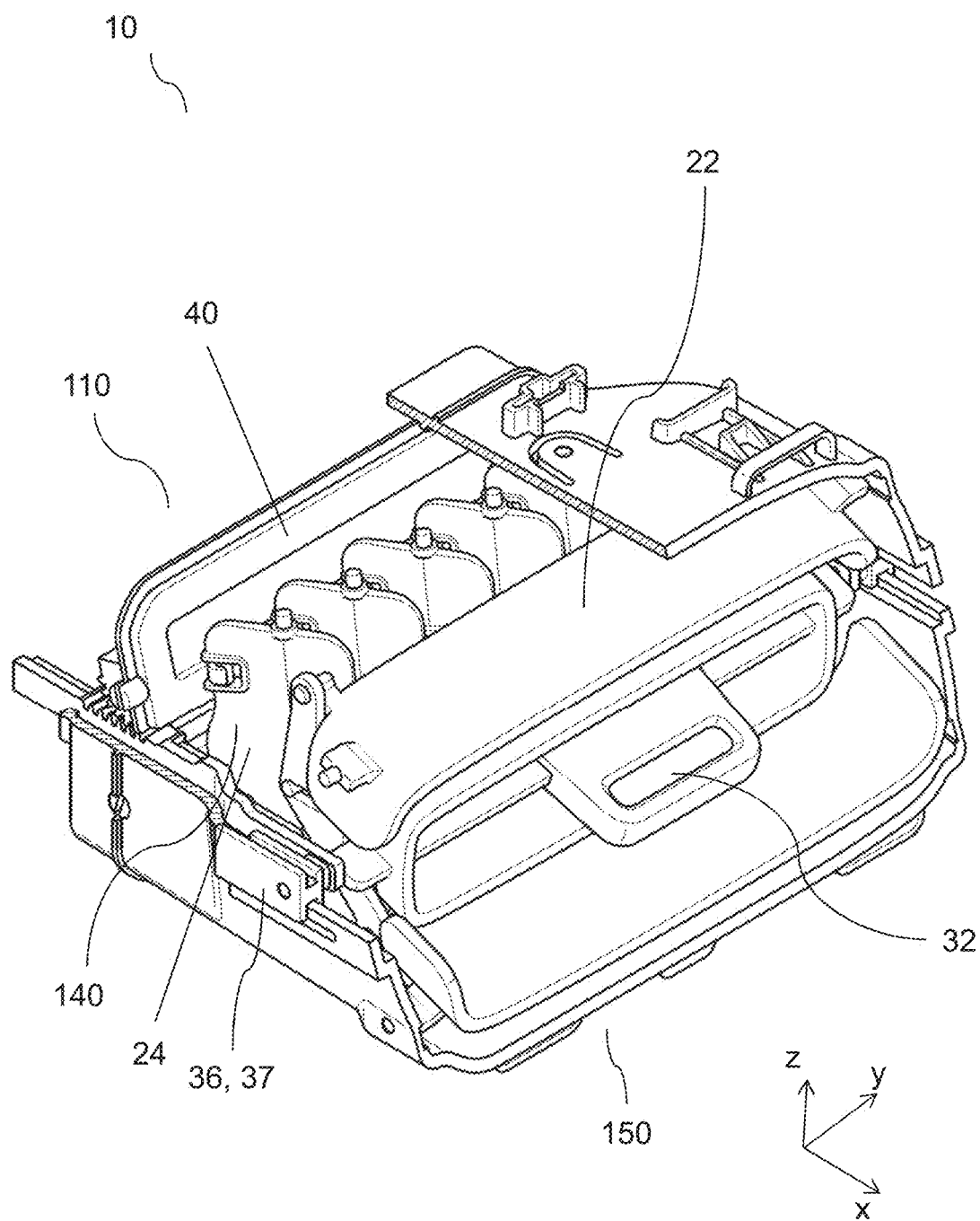
FIG. 3c illustrates the first example embodiment of the air nozzle device in an operational state, in which the shutoff mechanism for regulating the air flow is in the closed position, the vertical air flow adjustment arrangement for adjusting the air flow in the vertical direction Z is in the outer first (lower) position and the horizontal air flow adjustment arrangement for adjusting the air flow in the horizontal direction X is in an outer second transverse (left) position.

FIG. 3c illustrates the first example embodiment of the air nozzle device in an operational state, in which the shutoff mechanism 40 for regulating the air flow is in the closed position 110, the vertical air flow adjustment arrangement 22 for adjusting the air flow in the vertical direction Z is in the outer first (lower) position 150 and the horizontal air flow adjustment arrangement for adjusting the air flow in the horizontal direction X is in the outer second transverse (left) position 140.

Figure 3D:
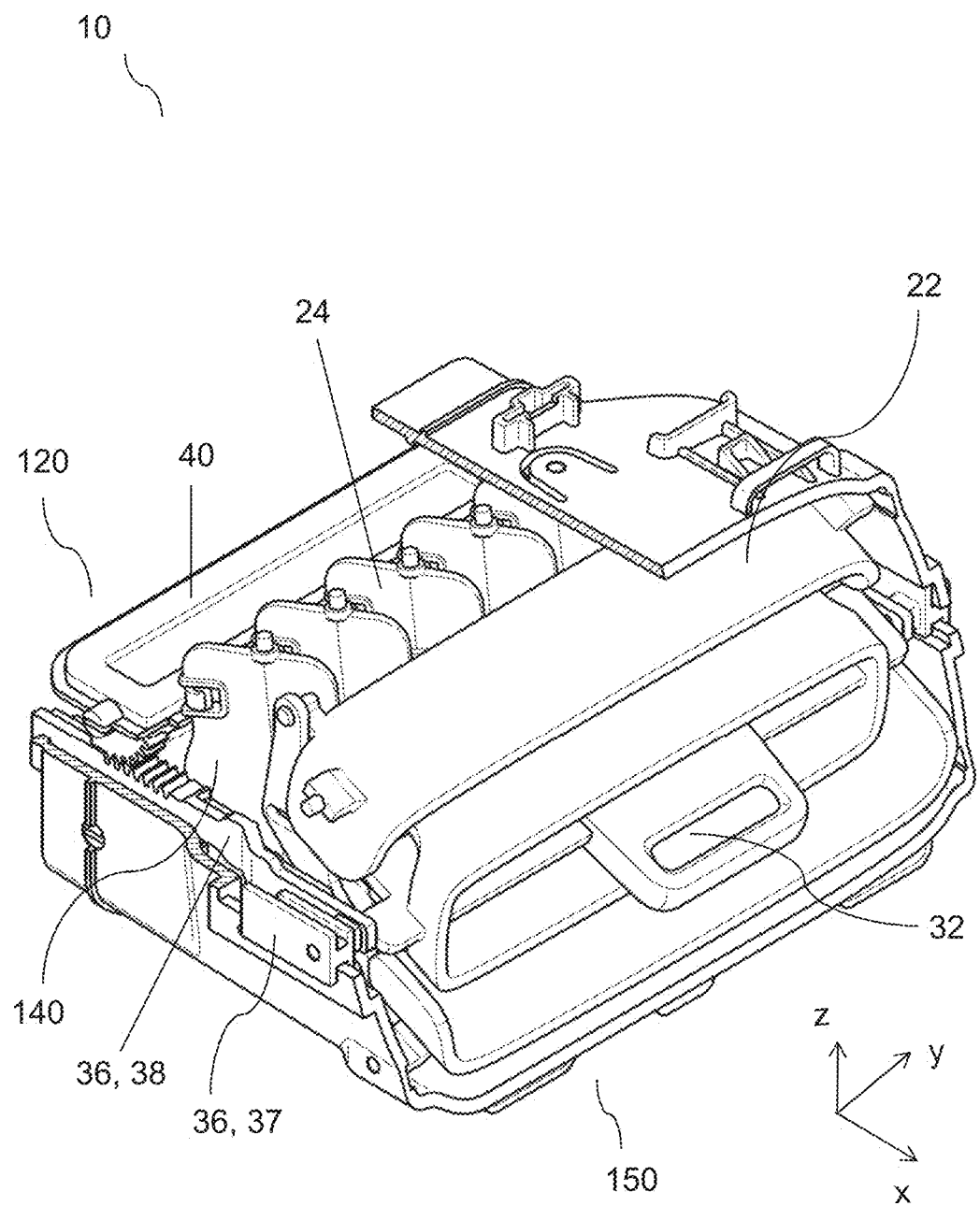
FIG. 3d illustrates the first example embodiment of the air nozzle device in an operational state, in which the shutoff mechanism for regulating the air flow is in the open position, the vertical air flow adjustment arrangement for adjusting the air flow in the vertical direction Z is in the outer first (lower) position and the horizontal air flow adjustment arrangement for adjusting the air flow in the horizontal direction X is in the outer second transverse (left) position.

Moreover, FIG. 3d illustrates the first example embodiment of the air nozzle device in an operational state, in which a shutoff mechanism 40 for regulating the air flow is in the open position 120, the vertical air flow adjustment arrangement 22 for adjusting the air flow in the vertical direction Z is in an outer first (lower) position 150 and the horizontal air flow adjustment arrangement 24 for adjusting the air flow in the horizontal direction X is in the outer second transverse (left) position 140.

In other words, the operational state as described in relation to FIG. 3c only differs from the operational state as described in relation to FIG. 3d in that the shutoff mechanism 40 is adjusted from the closed position, as shown in FIG. 3c, to the open position, as shown FIG. 3d, while the position of the arrangement 22 and the position of the arrangement 24 are maintained, i.e. the position of the arrangement 22 and the position of the arrangement 24 are unaffected by the regulation of the air flow (an adjustment of the shutoff mechanism 40) also when the horizontal air flow adjustment arrangement 24 is in the outer second transverse (left) position 140. As such, the user-actuated manual mechanism 32 has been moved along the longitudinal direction X from a first position to a second position along the longitudinal direction X without affecting the positions of the arrangements 22 and 24. Accordingly, by the configurations of the shutoff mechanism 40, the arrangement 22, the arrangement 24, the first linkage assembly 34, the second linkage assembly 36 and the user-actuated manual mechanism 32 as described above in relation to FIGS. 1a-1d and FIG. 2a-2d, it becomes possible to regulate the air flow via the shutoff mechanism 40 independently of the position of the vertical air flow adjustment arrangement 22 and the horizontal air flow adjustment arrangement 24.

Figure 3E:
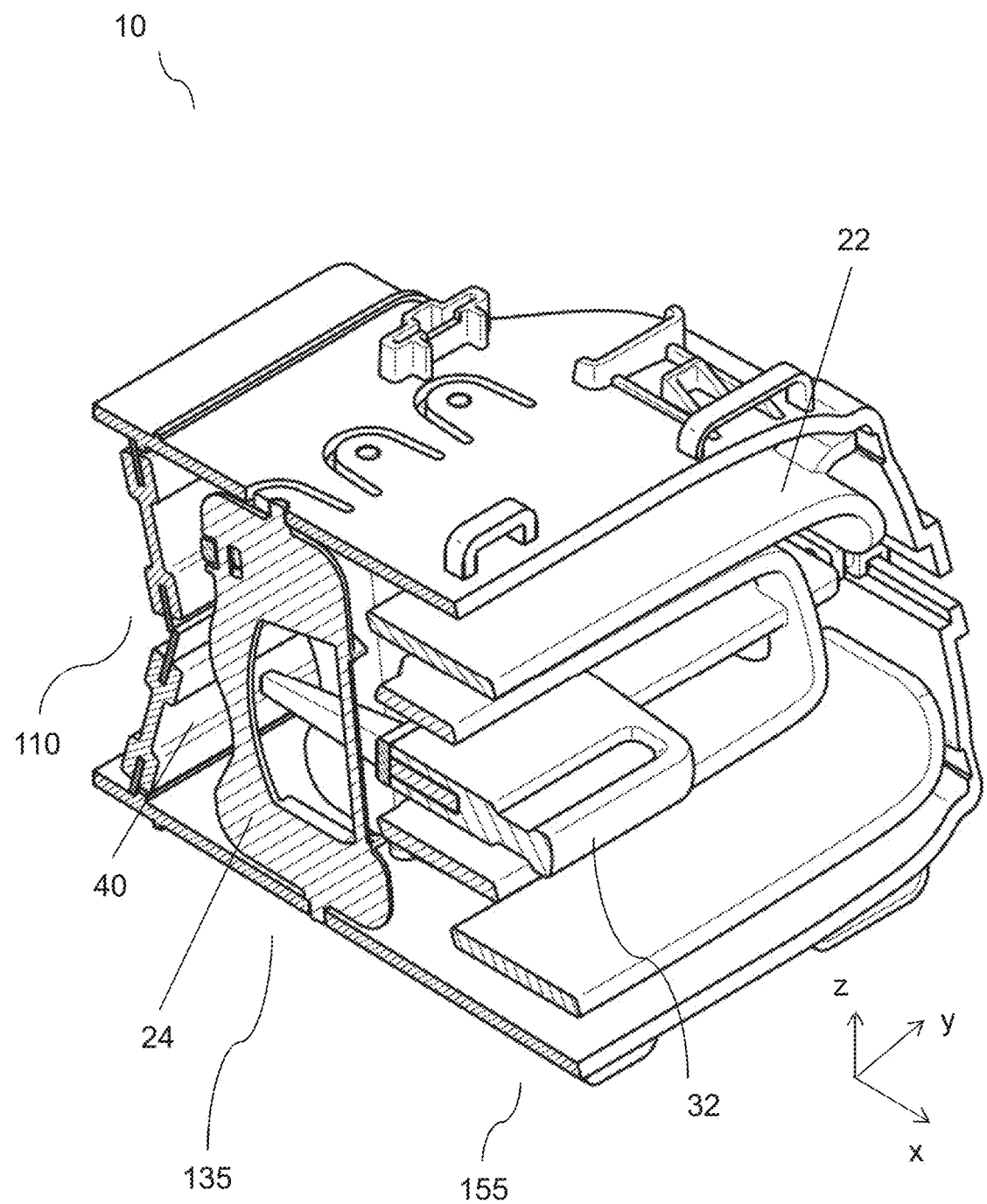
FIG. 3e is a cross-sectional view of the first example embodiment of the air nozzle device in an operational state, in which the shutoff mechanism for regulating the air flow is in the closed position, the vertical air flow adjustment arrangement for adjusting the air flow in the vertical direction Z is in a nominal position and the horizontal air flow adjustment arrangement for adjusting the air flow in the horizontal direction X is in a nominal position.

FIG. 3e is a cross-sectional view of the first example embodiment of the air nozzle device in an operational state, in which a shutoff mechanism 40 for regulating the air flow is in the closed position 110, the vertical air flow adjustment arrangement 22 for adjusting the air flow in the vertical direction Z is in a nominal position 155 and the horizontal air flow adjustment arrangement 24 for adjusting the air flow in the horizontal direction X is in a nominal position 135.

In this type of configuration of the air nozzle device, a nominal position of the arrangement 22 typically refers to a position of the arrangement 22 that guides the air flow essentially parallel to the XY-plane.

Analogously, in this type of configuration of the air nozzle device, a nominal position of the arrangement 24 typically refers to a position of the arrangement 24 that guides the air flow essentially parallel to the XZ-plane.

Figure 3F:
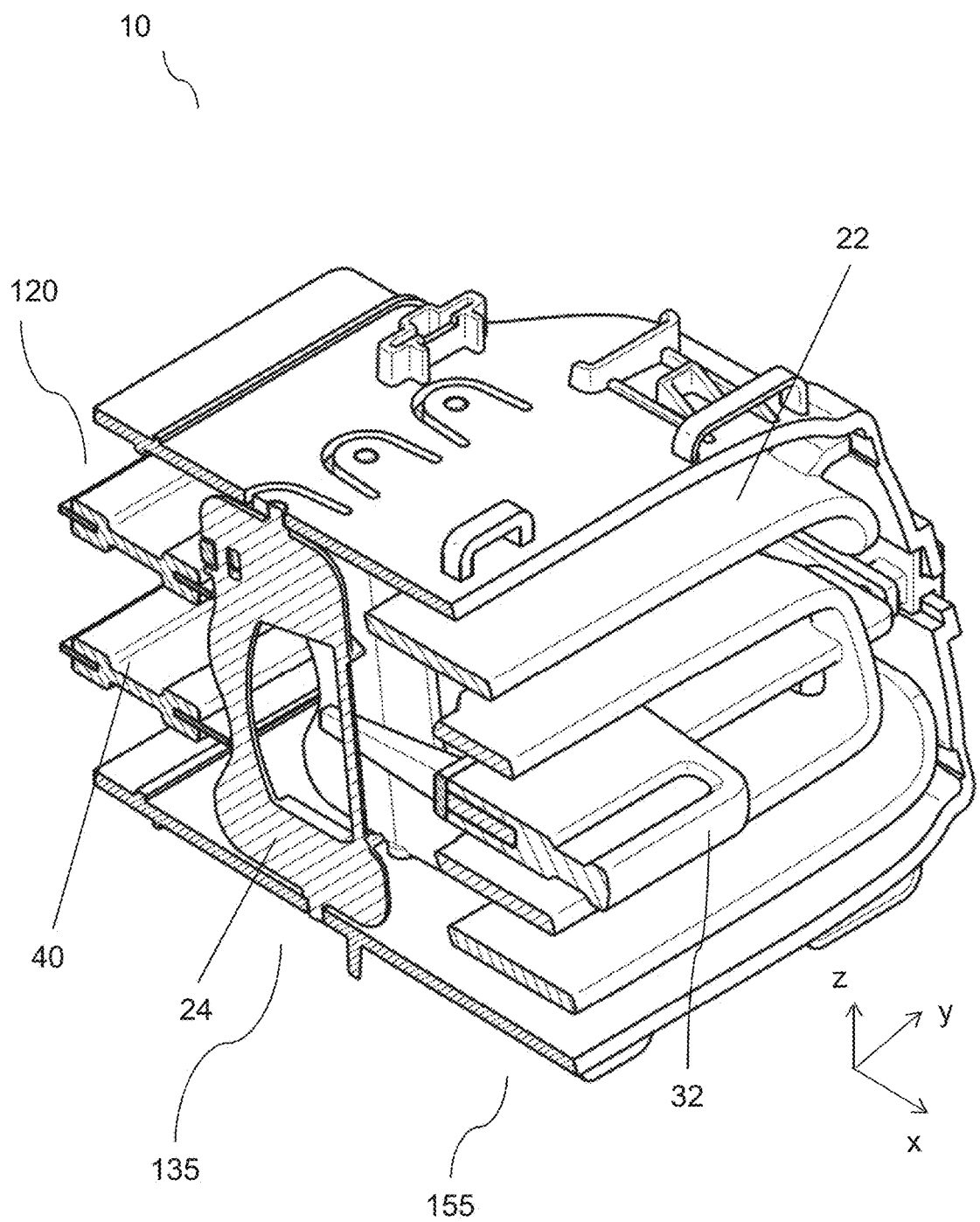
FIG. 3f is a cross-sectional view of the first example embodiment of the air nozzle device in an operational state, in which the shutoff mechanism for regulating the air flow is in an open position, the vertical air flow adjustment arrangement for adjusting the air flow in the vertical direction Z is in the nominal position and the horizontal air flow adjustment arrangement for adjusting the air flow in the horizontal direction X is in the nominal position.

FIG. 3f is a cross-sectional view of the first example embodiment of the air nozzle device in an operational state, in which the shutoff mechanism 40 for regulating the air flow is in an open position 120, the vertical air flow adjustment arrangement 22 for adjusting the air flow in the vertical direction Z is in the nominal position 155 and the horizontal air flow adjustment arrangement 24 for adjusting the air flow in the horizontal direction X is in the nominal position 135.

In other words, the operational state as described in relation to FIG. 3e only differs from the operational state as described in relation to FIG. 3f in that the shutoff mechanism 40 is adjusted from the closed position, as shown in FIG. 3e, to the open position, as shown FIG. 3f, while the position of the arrangement 22 and the position of the arrangement 24 are maintained, i.e. the position of the arrangement 22 and the position of the arrangement 24 are unaffected by the regulation of the air flow (an adjustment of the shutoff mechanism 40) also when the horizontal air flow adjustment arrangement 24 is in the nominal position 135 and the vertical air flow adjustment arrangement 22 is in the nominal position 155. As such, the user-actuated manual mechanism 32 has been moved along the longitudinal direction X, i.e. from a first position to a second position along the longitudinal direction X without affecting the positions of the arrangements 22 and 24. Accordingly, by the configurations of the shutoff mechanism 40, the arrangement 22, the arrangement 24, the assemblies 34 and 36, and the user-actuated manual mechanism 32 as described above in relation to FIGS. 1a-1d and FIG. 2a-2d, it becomes possible to regulate the air flow via the shutoff mechanism 40 independently of the position of the vertical air flow adjustment arrangement 22 and the horizontal air flow adjustment arrangement 24.

Figure 3G:
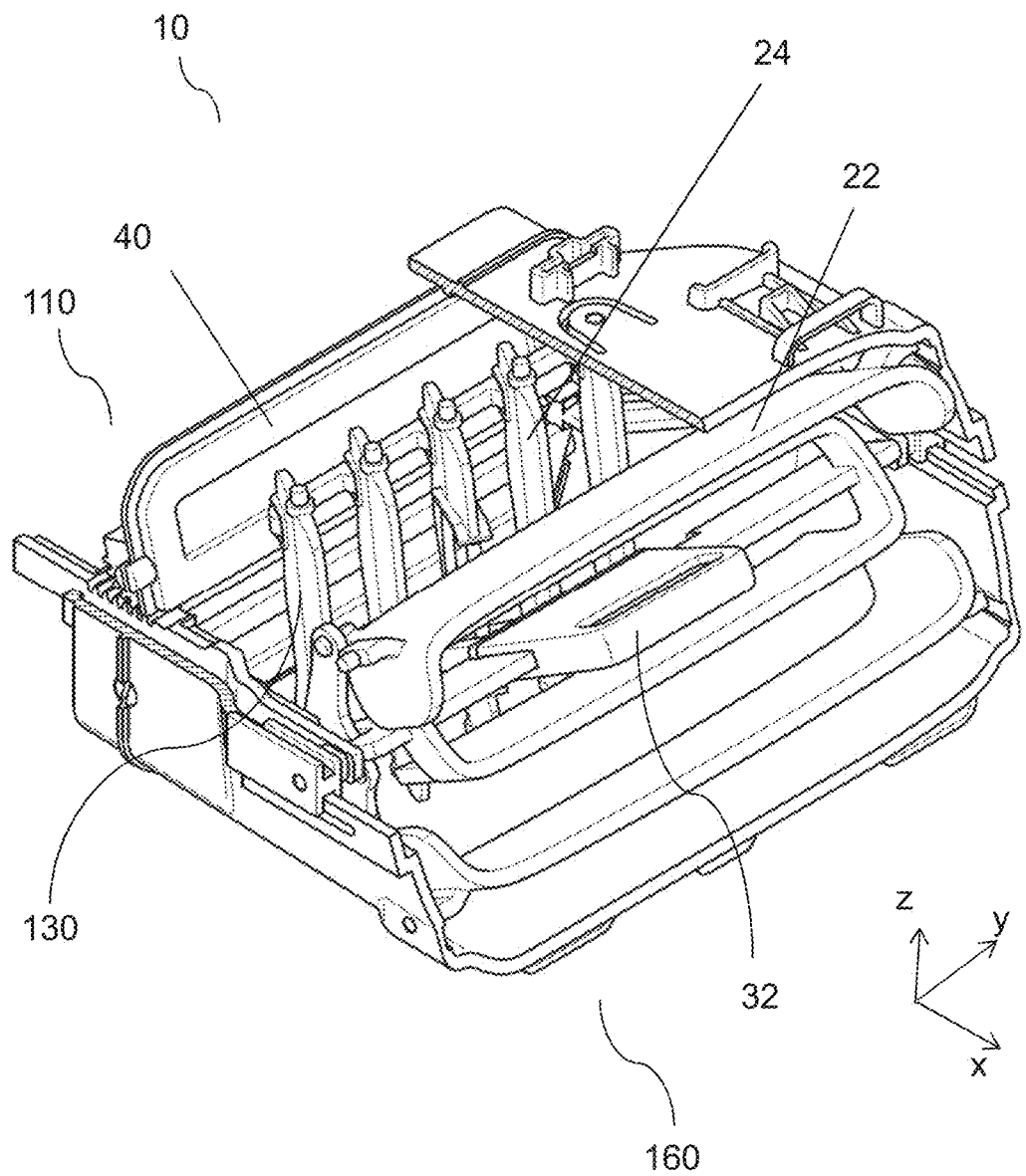
FIG. 3g illustrates the first example embodiment of the air nozzle device in an operational state, in which the shutoff mechanism for regulating the air flow is in the closed position, the vertical air flow adjustment arrangement for adjusting the air flow in the vertical direction Z is in an outer second (upper) position and the horizontal air flow adjustment arrangement for adjusting the air flow in the horizontal direction X is in the outer first transverse (right) position.

FIG. 3g illustrates the first example embodiment of the air nozzle device in an operational state, in which the shutoff mechanism 40 for regulating the air flow is in the closed position 110, the vertical air flow adjustment arrangement 22 for adjusting the air flow in the vertical direction Z is in an outer second (upper) position 160 and the horizontal air flow adjustment arrangement for adjusting the air flow in the horizontal direction X is in the outer first transverse (right) position 130.

Accordingly, in this operational state, the user-actuated manual mechanism 32 has been angled upwardly as seen in the vertical direction Z to move the vertical air flow adjustment arrangement 22 to the outer second (upper) position 160. In this manner, the air flow is directed upwardly as shown in FIG. 3g. Since the user-actuated manual mechanism 32 is operatively connected to e.g. a flange of the vertical air flow adjustment arrangement 22, the adjustment of the vertical air flow adjustment arrangement 22 is changed (effected) upon a movement of the user-actuated manual mechanism 32 along the vertical direction Z. In other words, the user-actuated manual mechanism 32 is pivoting about a transverse axis.

Figure 3H:
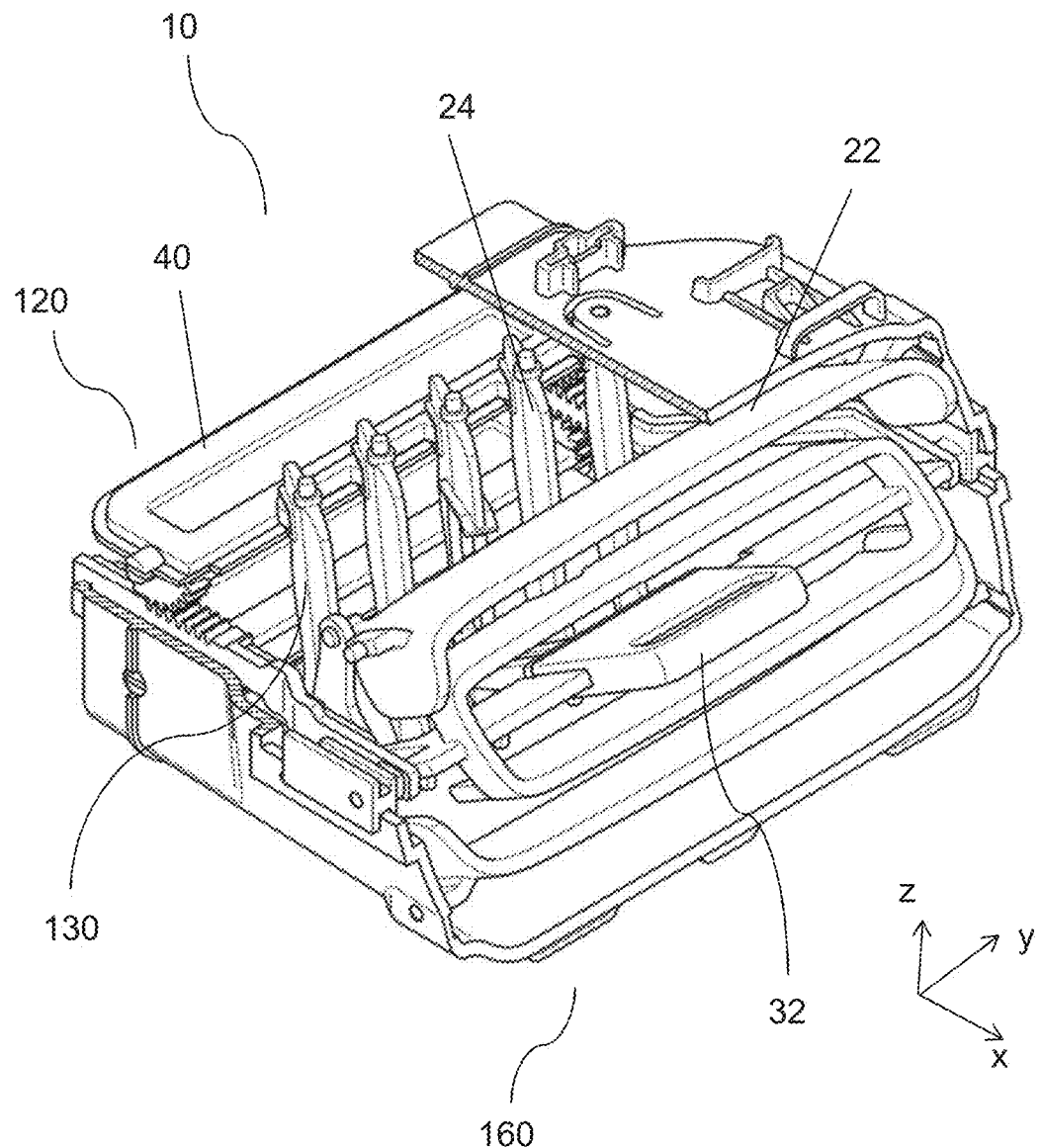
FIG. 3h illustrates the first example embodiment of the air nozzle device in an operational state, in which the shutoff mechanism for regulating the air flow is in the open position, the vertical air flow adjustment arrangement for adjusting the air flow in the vertical direction Z is in the outer second (upper) position and the horizontal air flow adjustment arrangement for adjusting the air flow in the horizontal direction X is in the outer first transverse (right) position.

FIG. 3h illustrates the first example embodiment of the air nozzle device in an operational state, in which the shutoff mechanism 40 for regulating the air flow is in the open position 120, the vertical air flow adjustment arrangement 22 for adjusting the air flow in the vertical direction Z is in the outer second (upper) position 160 and the horizontal air flow adjustment arrangement 24 for adjusting the air flow in the horizontal direction X is in the outer first transverse (right) position 130.

In other words, the operational state as described in relation to FIG. 3g only differs from the operational state as described in relation to FIG. 3h in that the shutoff mechanism 40 is adjusted from the closed position, as shown in FIG. 3g, to the open position, as shown FIG. 3h, while the position of the arrangement 22 and the position of the arrangement 24 are maintained, i.e. the position of the arrangement 22 and the position of the arrangement 24 are unaffected by the regulation of the air flow (an adjustment of the shutoff mechanism 40) also when the vertical air flow adjustment arrangement 22 is in the outer second (upper) position 160. As such, the user-actuated manual mechanism 32 has been moved along the longitudinal direction X, i.e. from a first position to a second position along the longitudinal direction X without affecting the positions of the arrangements 22 and 24. Accordingly, by the configurations of the shutoff mechanism 40, the arrangement 22, the arrangement 24, the assemblies 34 and 36, and user-actuated manual mechanism 32 as described above in relation to FIGS. 1a-1d and FIG. 2a-2d, it becomes possible to regulate the air flow via the shutoff mechanism 40 independently of the position of the vertical air flow adjustment arrangement 22 and the horizontal air flow adjustment arrangement 24.

Figure 3I:
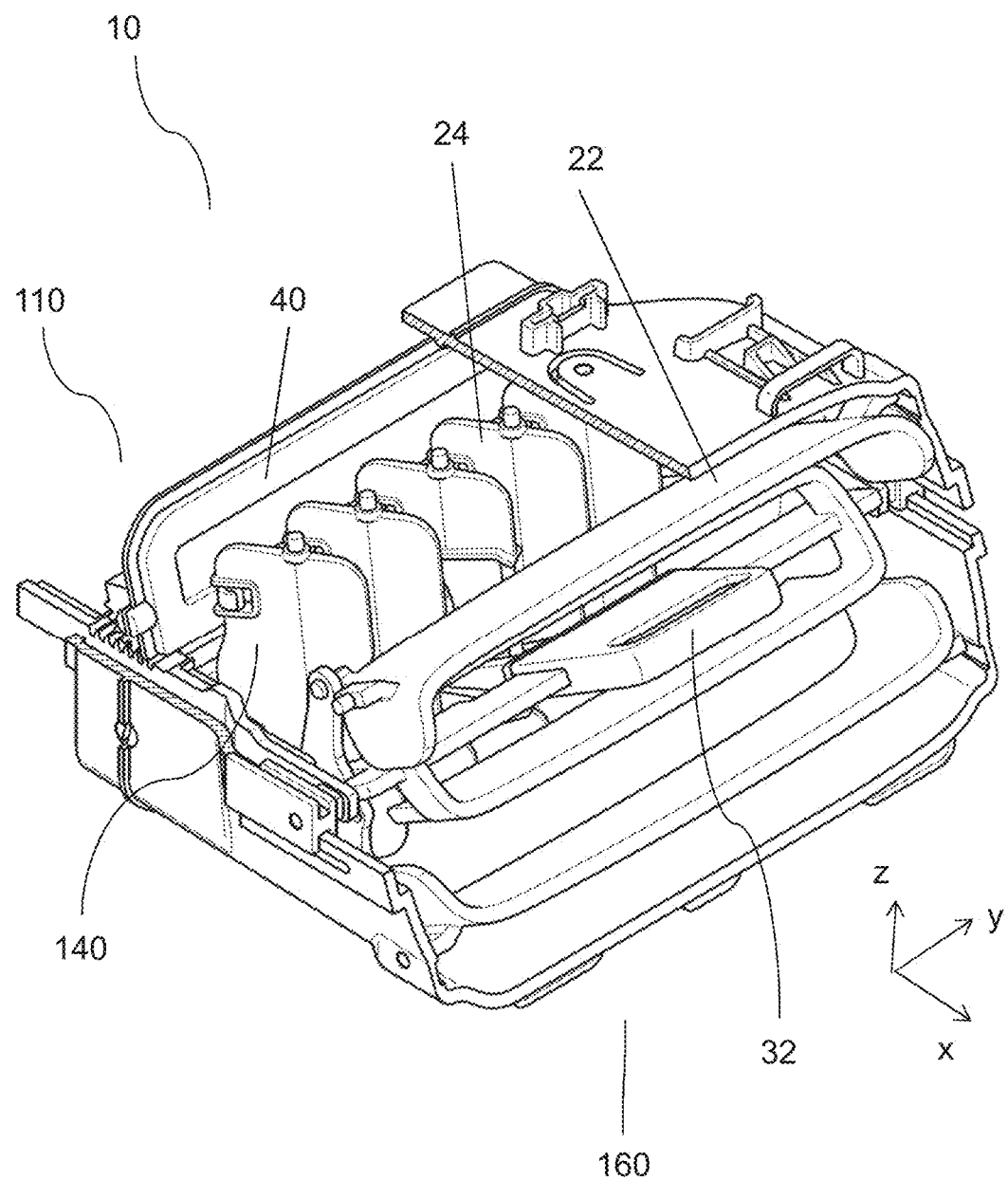
FIG. 3i illustrates the first example embodiment of the air nozzle device in an operational state, in which the shutoff mechanism for regulating the air flow is in the closed position, the vertical air flow adjustment arrangement for adjusting the air flow in the vertical direction Z is in the outer second (upper) position and the horizontal air flow adjustment arrangement for adjusting the air flow in the horizontal direction X is in the outer second transverse (left) position.

FIG. 3i illustrates the first example embodiment of the air nozzle device in an operational state, in which the shutoff mechanism 40 for regulating the air flow is in the closed position 110, the vertical air flow adjustment arrangement 22 for adjusting the air flow in the vertical direction Z is in the outer second (upper) position 160 and the horizontal air flow adjustment arrangement 24 for adjusting the air flow in the horizontal direction X is in the outer second transverse (left) position 140.

Figure 3J:
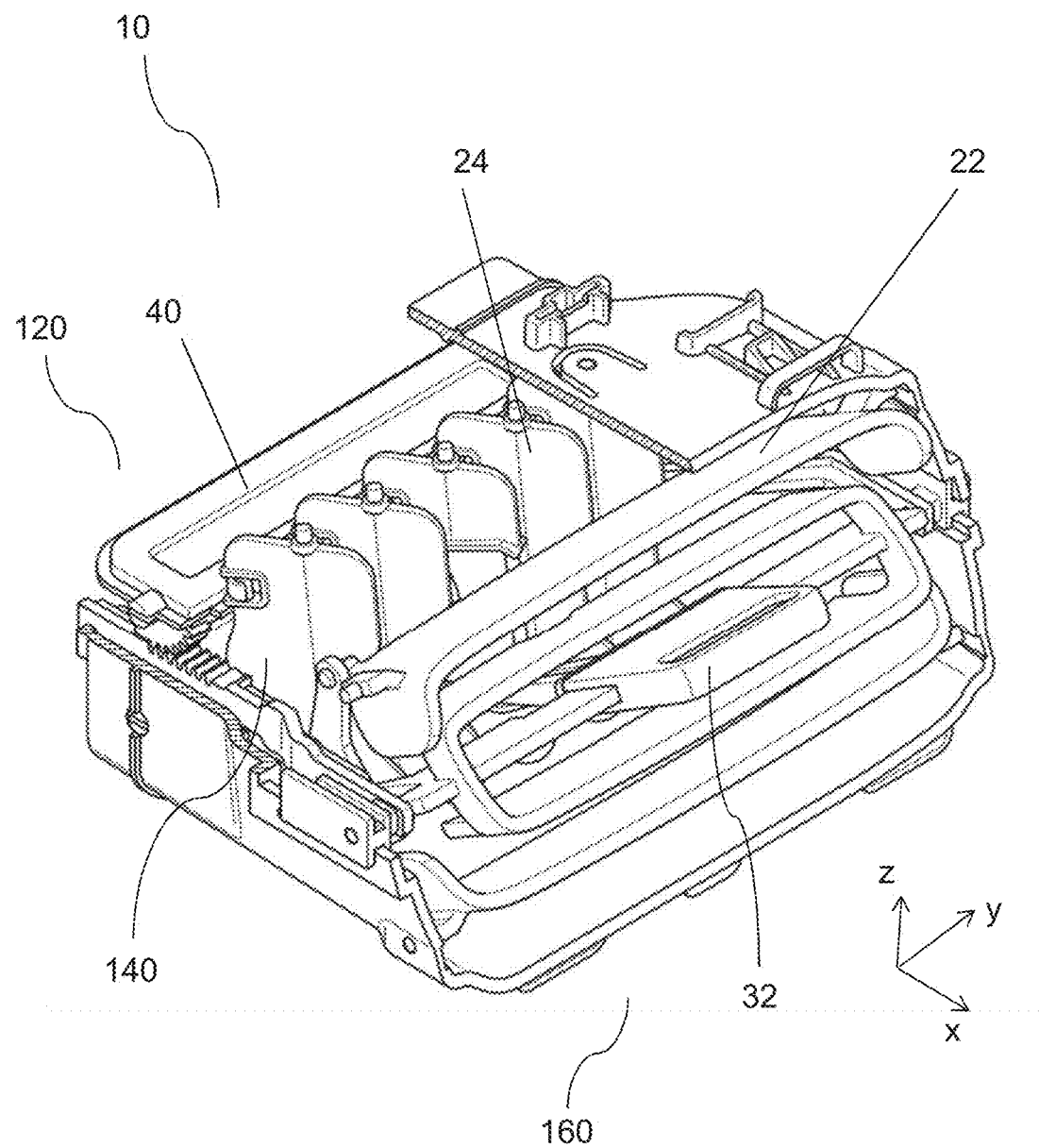
FIG. 3j illustrates the first example embodiment of the air nozzle device in an operational state, in which the shutoff mechanism for regulating the air flow is in the open position, the vertical air flow adjustment arrangement for adjusting the air flow in the vertical direction Z is in the outer second (upper) position and the horizontal air flow adjustment arrangement for adjusting the air flow in the horizontal direction X is in the outer second transverse (left) position.

FIG. 3j illustrates the first example embodiment of the air nozzle device in an operational state, in which the shutoff mechanism 40 for regulating the air flow is in the open position 120, the vertical air flow adjustment arrangement 22 for adjusting the air flow in the vertical direction Z is in the outer second (upper) position 160 and the horizontal air flow adjustment arrangement 24 for adjusting the air flow in the horizontal direction X is in the outer second transverse (left) position 140.

In other words, the operational state as described in relation to FIG. 3i only differs from the operational state as described in relation to FIG. 3j in that the shutoff mechanism 40 is adjusted from the closed position, as shown in FIG. 3i, to the open position, as shown FIG. 3j, while the position of the arrangement 22 and the position of the arrangement 24 are maintained, i.e. the position of the arrangement 22 and the position of the arrangement 24 are unaffected by the regulation of the air flow (an adjustment of the shutoff mechanism 40) also when the horizontal air flow adjustment arrangement 24 is in the outer second transverse (left) position 140 and the vertical air flow adjustment arrangement 22 is in the outer second (upper) position 160. As such, the user-actuated manual mechanism 32 has been moved along the longitudinal direction X, i.e. from a first position to a second position along the longitudinal direction X without affecting the positions of the arrangements 22 and 24. Accordingly, by the configurations of the shutoff mechanism 40, the arrangement 22, the arrangement 24, the linkage assemblies 34 and 36, and the user-actuated manual mechanism 32 as described above in relation to FIGS. 1a-1d and FIG. 2a-2d, it becomes possible to regulate the air flow via the shutoff mechanism 40 independently of the position of the vertical air flow adjustment arrangement 22 and the horizontal air flow adjustment arrangement 24.

Moreover, it is to be noted from FIG. 3a and FIG. 3c, that the horizontal air flow adjustment arrangement 24 can be adjusted independently of the position of the vertical air flow adjustment arrangement 22. That is, the horizontal air flow adjustment arrangement 24 is adjusted from the outer first transverse (left) position 130 to the outer second transverse (left) position 140, while the position of the vertical air flow adjustment arrangement 22 is maintained in the outer first (lower) position 150. Furthermore, the horizontal air flow adjustment arrangement 24 can be adjusted independently on the position of the shutoff mechanism 40, as is illustrated from FIGS. 3a and 3c and/or FIGS. 3b and 3d. That is, FIGS. 3a and 3c reflect the shutoff mechanism in the closed position, while FIGS. 3b and 3d reflect the shutoff mechanism in the open position.

Analogously, FIG. 3a and FIG. 3g illustrates that the vertical air flow adjustment arrangement 22 can be adjusted independently of the position of the horizontal air flow adjustment arrangement 24. That is, the vertical air flow adjustment arrangement 22 is adjusted from the outer first (lower) position 150 to the outer second (upper) position 160, while the position of the horizontal air flow adjustment arrangement 24 is maintained in the outer first transverse (left) position 130.

Furthermore, the vertical air flow adjustment arrangement 22 can be adjusted independently on the position of the shutoff mechanism 40, as is illustrated from FIGS. 3a and 3g and/or FIGS. 3b and 3i. That is, FIGS. 3a and 3g reflect the shutoff mechanism in the closed position, while FIGS. 3b and 3h reflect the shutoff mechanism in the open position.

It should therefore be readily appreciated from the FIGS. 3a through 3j, and the explanations above, that the user-actuated manual mechanism 32 is capable of independently controlling any one of the shutoff mechanism 40, the vertical air flow adjustment arrangement 22 and the horizontal air flow adjustment arrangement 24 to set the air nozzle device in a desired configuration so as to allow a user to regulate and direct the air flow depending on the user's wishes by manipulation via the user-actuated manual mechanism 32.

As mentioned above, the device typically, although not strictly required, comprises a vertical air flow adjustment arrangement 22 for adjusting the air flow in the vertical direction Z and a horizontal air flow adjustment arrangement 24 for adjusting the air flow in the horizontal direction X. In another example embodiment (not shown), the vertical air flow adjustment arrangement 22 and the horizontal air flow adjustment arrangement 24 may be provided in a single unit, i.e. being integrated into one single unit. Alternatively, or in addition, the function of the vertical air flow adjustment arrangement 22 and the function of the horizontal air flow adjustment arrangement 24 may be combined in one single unit.

It should be readily appreciated that the ultimate dimensions and the materials of the device and its components are selected based on the overall space available in the vehicle compartment, e.g. in the dashboard. However, as an example, the components of the device can be made of a suitable a plastics, a metal such as stainless steel of a combination of plastics and metal. E.g. some parts of the device can be made of metal and other parts of the device may be made by plastics.

As exemplified by the example embodiments above in relation to the FIGS. 1a through 3j, it becomes possible to provide a multi-functional air nozzle device in the sense that the configuration of the device allows for an independent adjustment of the air flow in the vertical direction, an independent adjustment of the air flow in the horizontal direction and an independent regulation of the air flow level. In this manner, the second linkage assembly is operatively connected to the user-actuated manual mechanism such that a movement of the shutoff mechanism is effected by a movement of the user-actuated manual mechanism in a longitudinal direction X without effecting or restricting an adjustment of the air flow adjustment arrangements, which are effected by a movement of the user-actuated manual mechanism in a transverse and/or vertical direction depending on horizontal or vertical air flow adjustment. To this end, the device provides a multi-functional solution which is both compact and robust, while allowing for an integrated push/pull function via the user-actuated manual mechanism that is easily operable from the outside of the device.

Although the invention has been described in relation to specific combinations of components, it should be readily appreciated that the components may be combined in other configurations as well which is clear for the skilled person when studying the present application. Thus, the above description of the example embodiments of the present invention and the accompanying drawings are to be regarded as a non-limiting example of the invention and the scope of protection is defined by the appended claims. Any reference sign in the claims should not be construed as limiting the scope.

The invention claimed is:

1. Air nozzle device for a vehicle comprising a housing defining an interior volume and having an air inlet at one side, an air discharge opening at a second side and an air flow channel through the housing for transporting a flow of air between the air inlet and the air discharge opening, the device further comprising a user-actuated manual mechanism, a moveable first linkage assembly, a moveable second linkage assembly, a shutoff mechanism configured to regulate the air flow, a first air flow adjustment arrangement and a second air flow adjustment arrangement, each being pivotably connected to said housing and configured to adjust the direction of the air flow, said first linkage assembly being operatively connected to the user-actuated manual mechanism at one end and further configured to define a channel or groove to accommodate a part of a guiding member of the second air flow adjustment arrangement, wherein the channel or groove extends at least partly in a longitudinal direction (X) to permit a movement of the first linkage assembly along the longitudinal direction (X) independently of the position of the first air flow adjustment arrangement and the position of the second air flow adjustment arrangement, while an adjustment of the second air flow adjustment arrangement is effected by a movement of the first linkage assembly in a transverse direction (Y), wherein said second linkage assembly is operatively connected to said user-actuated manual mechanism and configured to effect a regulation of the air flow via the shutoff mechanism by a movement of said user-actuated manual mechanism along the longitudinal direction (X), wherein said user-actuated manual mechanism is configured to permit manual operation of the first air flow adjustment arrangement, the second air flow adjustment arrangement and the shutoff mechanism from the outside of the device, wherein the first air flow adjustment arrangement comprises a set of spaced apart air directing elements in the form of blades or flanges that are pivotably arranged about pivoting connections, wherein said first air flow adjustment arrangement comprises a first module and a second module, said first module being configured to move relative to said second module along the longitudinal direction (X), and wherein said second linkage assembly is operatively connected to said user-actuated manual mechanism via said first module of said first air flow adjustment arrangement and configured to effect regulation of the air flow by the shutoff mechanism by a movement of said user-actuated manual mechanism and said first module along the longitudinal direction (X), and wherein each one of the first module and the second module is provided with at least one flange configured to be adjusted between a plurality of positions.

2. Device according to claim 1, wherein the user-actuated manual mechanism is slidably engaged to said first module of said first air flow adjustment arrangement and configured to be movable along the longitudinal direction (X) and the transverse direction (Y) upon operation of a user.

3. Device according to claim 1, wherein the second linkage assembly is configured to adjust the position of the shutoff mechanism upon a movement of the second linkage assembly in the longitudinal direction (X), and further configured to remain in position, as seen in the longitudinal direction (X), upon an adjustment of the first linkage assembly in the transverse direction (Y) and/or in a vertical direction (Z).

4. Device according to claim 1, wherein said second linkage assembly comprises a movable linkage member and a guiding member connected to the said housing, said linkage member being adapted at a first end to cooperate with said guiding member of said second linkage assembly and at a second end to cooperate with said shutoff mechanism so that a movement of said first module of said first air flow adjustment arrangement is transferred into a movement of said linkage member of said second linkage assembly along the longitudinal direction (X) to effect a regulation of the air flow by the shutoff mechanism.

5. Device according to claim 4, wherein the said guiding member is configured to allow for a displacement of said first module along the transverse direction (Y).

6. Device according to claim 5, wherein said first air flow arrangement further comprises an interconnecting member for connecting said first module and said second module of said first air flow adjustment arrangement.

7. Device according to claim 1, wherein said first air flow adjustment arrangement is a vertical air flow adjustment arrangement for adjusting the air flow in the vertical direction (Z) and said second air flow adjustment arrangement is a horizontal air flow adjustment arrangement for adjusting the air flow in the horizontal direction (X).

8. Device according to claim 7, wherein the vertical air flow adjustment arrangement is independently pivotably connected to the housing via at least one pivoting connection configured to permit at least a part of said vertical air flow adjustment arrangement to pivot about a transverse pivot axis.

9. Device according to claim 7, wherein the horizontal air flow adjustment arrangement is independently pivotably connected to the housing via at least one pivoting connection configured to permit said horizontal air flow adjustment arrangement to pivot about a vertical pivot axis.

10. Device according to claim 9, wherein the horizontal air flow adjustment arrangement comprises a set of spaced apart air directing elements pivotably arranged about the pivoting connections, and at least one of said air directing elements is configured to define said guiding member.

11. Device according to claim 1, wherein the first linkage assembly is arranged spaced apart from the second linkage assembly within said housing.

12. Device according to claim 1, further comprising a third linkage assembly, said second linkage assembly and said third linkage assembly being arranged on opposite ends of the air flow adjustment arrangement, as seen in the transverse direction (Y), wherein said third linkage assembly is operatively connected to said user-actuated manual mechanism and configured to effect a regulation of the air flow via the shutoff mechanism by a movement of said user-actuated manual mechanism along the longitudinal direction (X).

13. Device according to claim 1, wherein the shutoff mechanism is configured to move between an open position, defining a passage for the air flow in the air flow channel, and a closed position, defining an essentially air tight configuration against the inner surfaces of the housing, upon a movement of the second linkage assembly in the longitudinal direction (X).

14. Device according to claim 13, wherein the first air flow arrangement comprises an alignment member having a guiding surface adapted to engage with a corresponding guiding surface of the first module of the air flow arrangement.

15. Device according to claim 14, wherein the guiding surface defines a conical-shaped surface.

16. A vehicle compartment member comprising at least one of a dashboard, door trim, or console, wherein the vehicle compartment member comprises a device according to claim 1.

17. A vehicle comprising a vehicle compartment member according to claim 16.

* * * * *